United States Patent
Higashi et al.

(10) Patent No.: US 12,488,011 B2
(45) Date of Patent: Dec. 2, 2025

(54) DOCUMENT SEARCH SYSTEM, DOCUMENT SEARCH METHOD, PROGRAM, AND NON-TRANSITORY COMPUTER READABLE STORAGE MEDIUM

(71) Applicant: Semiconductor Energy Laboratory Co., Ltd., Atsugi (JP)

(72) Inventors: Kazuki Higashi, Atsugi (JP); Junpei Momo, Sagamihara (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 0 days.

(21) Appl. No.: 18/635,181

(22) Filed: Apr. 15, 2024

(65) Prior Publication Data

US 2024/0273108 A1   Aug. 15, 2024

Related U.S. Application Data

(63) Continuation of application No. 17/064,871, filed on Oct. 7, 2020, now Pat. No. 12,019,636, which is a (Continued)

(30) Foreign Application Priority Data

Mar. 23, 2018 (JP) ................. 2018-055934

(51) Int. Cl.
*G06F 16/2457* (2019.01)
*G06F 16/93* (2019.01)
(Continued)

(52) U.S. Cl.
CPC ........ *G06F 16/24578* (2019.01); *G06F 16/93* (2019.01); *G06F 40/268* (2020.01);
(Continued)

(58) Field of Classification Search
CPC ........................... G06F 16/24578; G06F 16/93
See application file for complete search history.

(56) References Cited

U.S. PATENT DOCUMENTS 8,200,695 B2   6/2012   Cha et al.
10,141,069 B2   11/2018   Ikeda. et al.
(Continued)

FOREIGN PATENT DOCUMENTS

CN   101055580 A   10/2007
CN   103886063 A   6/2014
(Continued)

OTHER PUBLICATIONS

Takano.A et al., "Development of the generic association engine for processing large corpora", Mar. 30, 2007, IPA.
(Continued)

*Primary Examiner* — Hau H Hoang
(74) *Attorney, Agent, or Firm* — Fish & Richardson P.C.

(57) ABSTRACT

A highly accurate document search, particularly a search for a document relating to intellectual property, is achieved with an easy input method. A document search system includes a processing portion. The processing portion has a function of extracting a keyword included in text data, a function of extracting a related term of the keyword from words included in a plurality of pieces of first reference text analysis data, a function of giving a weight to each of the keyword and the related term, a function of giving a score to each of a plurality of pieces of second reference text analysis data on the basis of the weight, a function of ranking the plurality of pieces of second reference text analysis data on the basis of the score to generate ranking data, and a function of outputting the ranking data.

10 Claims, 16 Drawing Sheets

S14 or S34

Related U.S. Application Data continuation of application No. 16/979,197, filed as application No. PCT/IB2019/052022 on Mar. 13, 2019, now Pat. No. 11,789,953.

(51) Int. Cl.
  *G06F 40/268* (2020.01)
  *G06F 40/279* (2020.01)
  *G06N 3/08* (2023.01)
  *G06N 20/00* (2019.01)
  *G06Q 10/10* (2023.01)
  *G06Q 50/18* (2012.01)

(52) U.S. Cl.
  CPC ............ *G06F 40/279* (2020.01); *G06N 3/08* (2013.01); *G06N 20/00* (2019.01); *G06F 2216/11* (2013.01); *G06Q 10/10* (2013.01); *G06Q 50/184* (2013.01)

(56) References Cited

U.S. PATENT DOCUMENTS

| | | | |
|---|---|---|---|
| 10,699,794 | B2 | 6/2020 | Ikeda et al. |
| 11,086,857 | B1 | 8/2021 | Ganu et al. |
| 11,182,806 | B1 | 11/2021 | Arfa et al. |
| 2008/0168288 | A1 | 7/2008 | Jia et al. |
| 2014/0067846 | A1 | 3/2014 | Edwards et al. |
| 2014/0324808 | A1 | 10/2014 | Sandhu et al. |
| 2016/0328388 | A1 | 11/2016 | Cao et al. |
| 2016/0343452 | A1 | 11/2016 | Ikeda et al. |
| 2018/0032606 | A1 | 2/2018 | Tolman et al. |
| 2019/0155915 | A1 | 5/2019 | Huang et al. |
| 2019/0221204 | A1 | 7/2019 | Zhang et al. |
| 2020/0176069 | A1 | 6/2020 | Ikeda et al. |

FOREIGN PATENT DOCUMENTS

| | | |
|---|---|---|
| CN | 105631009 A | 6/2016 |
| CN | 106776713 A | 5/2017 |
| CN | 107247780 A | 10/2017 |
| CN | 109002473 A | 12/2018 |
| JP | 03-172966 A | 7/1991 |
| JP | 08-263521 A | 10/1996 |
| JP | 2007-065745 A | 3/2007 |
| JP | 2011-039639 A | 2/2011 |
| JP | 2014-106665 A | 6/2014 |
| JP | 2015-041239 A | 3/2015 |
| JP | 2016-219011 A | 12/2016 |
| JP | 2017-130195 A | 7/2017 |
| JP | 2017-134675 A | 8/2017 |
| WO | WO-2017/107566 | 6/2017 |

OTHER PUBLICATIONS

International Search Report (Application No. PCT/IB2019/052022) Dated Jun. 18, 2019.
Written Opinion (Application No. PCT/IB2019/052022) Dated Jun. 18, 2019.
word2vec, https://github.com/imsky/word2vec, Jan. 31, 2015.
Nakayama. Y, "Feature extraction and TF-IDF", https://qiita.com/ynakayama/items/300460aa718363abc85c, Jun. 23, 2014.
Dwaipayan.R et al., "Using Word Embeddings for Automatic Query Expansion", Jul. 21, 2016.
Chinese Office Action (Application No. 201980033402.2) dated Apr. 25, 2024.
Chinese Office Action (Application No. 201980033402.2) dated Apr. 3, 2025.
Chinese Office Action (Application No. 201980033402.2) dated Nov. 12, 2024.

FIG. 7A
S15, S16
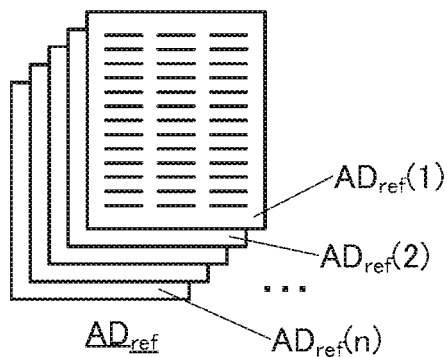
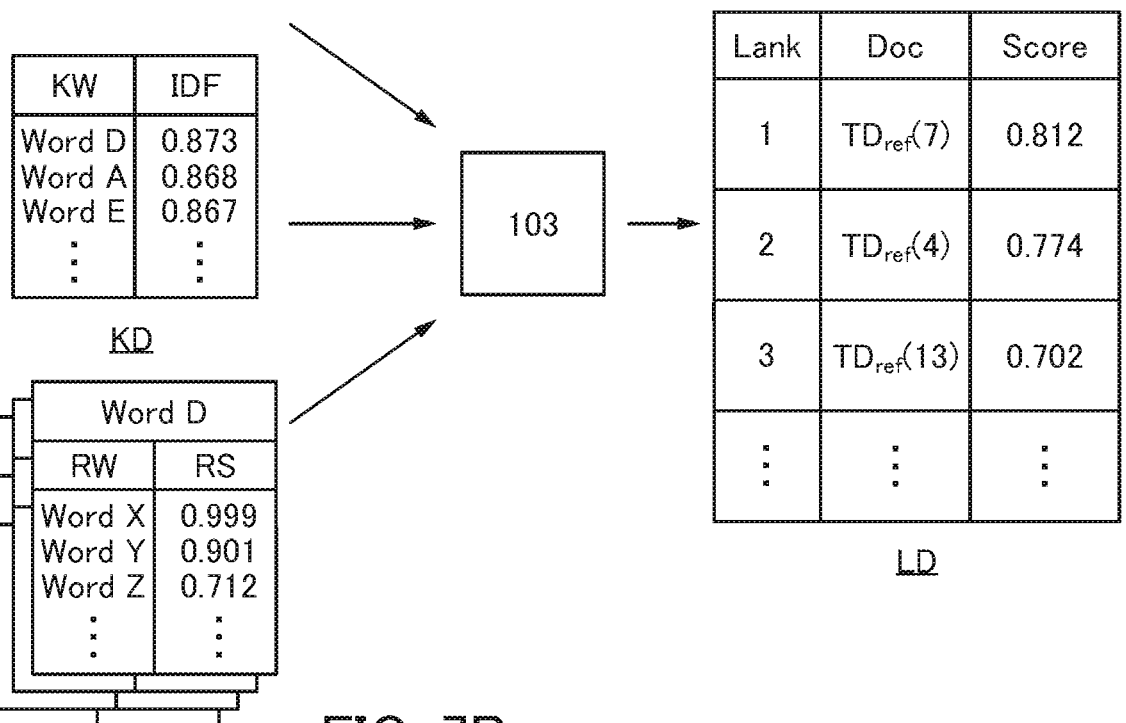
FIG. 7B

| Keyword KW (IDF) | Related term RW (IDF x RS) | | | | |
|---|---|---|---|---|---|
| Word D (0.9) | Word X (0.9) | Word Y (0.8) | Word Z (0.6) | Word a (0.5) | ... |
| Word A (0.9) | Word b (0.5) | Word c (0.5) | Word d (0.45) | Word e (0.3) | ... |
| Word E (0.8) | Word f (0.75) | Word g (0.75) | Word h (0.75) | Word i (0.75) | ... |
| ⋮ | ⋮ | ⋮ | ⋮ | ⋮ | ⋮ |

| Keyword KW (IDF) | Related term RW (IDF x RS) | | | | |
|---|---|---|---|---|---|
| Word D (0.9) | Word X (0.9) | Word Y (0.8) | Word Z (0.6) | Word x (0.8) | ... |
| Word E (0.8) | Word f (0.8) | Word g (0.75) | Word h (0.75) | Word i (0.75) | ... |
| ⋮ | ⋮ | ⋮ | ⋮ | ⋮ | ⋮ |

DOCUMENT SEARCH SYSTEM, DOCUMENT SEARCH METHOD, PROGRAM, AND NON-TRANSITORY COMPUTER READABLE STORAGE MEDIUM

TECHNICAL FIELD

One embodiment of the present invention relates to a document search system, a document search method, a program, and a non-transitory computer readable storage medium. One embodiment of the present invention relates to a document search system and a document search method relating to intellectual property.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input/output device (e.g., a touch panel), a driving method thereof, and a manufacturing method thereof.

BACKGROUND ART

Prior art search before application for an invention can reveal if there is a relevant intellectual property right. Domestic or foreign patent documents, papers, and the like obtained through the prior art search are helpful in confirming the novelty and non-obviousness of the invention and determining whether to file the application. In addition, patent invalidity search can reveal whether there is a possibility of invalidation of the patent right owned by an applicant or whether the patent rights owned by others can be rendered invalidation.

When a user enters a keyword into a patent document search system, the system will output patent documents containing the keyword, for example.

To conduct highly accurate prior art search with such a system, a user needs to have good techniques; for example, a user should select a proper search keyword and have to pick up needed patent documents from many patent documents output by the system.

Use of artificial intelligence is under consideration for various applications. In particular, artificial neural networks are expected to provide computers having higher performance than conventional von Neumann computers. In recent years, a variety of studies on creation of artificial neural networks with electronic circuits have been carried out.

For example, Patent Document 1 discloses an invention in which weight data necessary for calculation with an artificial neural network is retained in a memory device including a transistor that contains an oxide semiconductor in its channel formation region.

REFERENCE

Patent Document

[Patent Document 1] United States Patent Application Publication No. 2016/0343452

SUMMARY OF THE INVENTION

Problems to be Solved by the Invention

An object of one embodiment of the present invention is to provide a document search system that enables highly accurate document search. Alternatively, an object of one embodiment of the present invention is to provide a document search method that enables highly accurate document search. Alternatively, an object of one embodiment of the present invention is to achieve highly accurate document search, especially for a document relating to intellectual property, with an easy input method.

Note that the descriptions of these objects do not disturb the existence of other objects. One embodiment of the present invention does not need to achieve all the objects. Other objects can be derived from the description of the specification, the drawings, and the claims.

Means for Solving the Problems

One embodiment of the present invention is a document search system including a processing portion. The processing portion has a function of extracting a keyword included in text data, a function of extracting a related term of the keyword from words included a plurality of pieces of first reference text analysis data, a function of giving a weight to each of the keyword and the related term, a function of giving a score to each of a plurality of pieces of second reference text analysis data on the basis of the weight, a function of ranking the plurality of pieces of second reference text analysis data on the basis of the score to generate ranking data, and a function of outputting the ranking data.

One embodiment of the present invention is a document search method including steps of extracting a keyword included in text data, extracting a related term of the keyword from words included in a plurality of pieces of first reference text analysis data, giving a weight to each of the keyword and the related term, giving a score to each of a plurality of pieces of second reference text analysis data on the basis of the weight, ranking the plurality of second reference text analysis data on the basis of the score to generate ranking data, and outputting the ranking data.

One embodiment of the present invention is a program having a processor executing a first step of extracting a keyword included in text data, a second step of extracting a related term of the keyword from words included in a plurality of pieces of first reference text analysis data, a third step of giving a weight to each of the keyword and the related term, a fourth step of giving a score to each of a plurality of pieces of second reference text analysis data on the basis of the weight of the keyword or the related term that matches a word included in the second reference text analysis data, and a fifth step of ranking the plurality of pieces of second reference text analysis data on the basis of the score to generate ranking data. Moreover, one embodiment of the present invention is a non-transitory computer readable storage medium storing the program.

It is preferable that the weight of the keyword be a value based on an inverse document frequency of the keyword in the plurality of pieces of first reference text analysis data or the plurality of pieces of second reference text analysis data. It is preferable that the weight of the related term be a product of the weight of the keyword by a value based on the similarity degree or the distance between a distributed representation vector of the related term and a distributed representation vector of the keyword.

It is preferable to give a score the second reference text analysis data including a word matching the keyword or the related term.

The plurality of pieces of first reference text analysis data may be the same as the plurality of pieces of second reference text analysis data.

It is preferable to extract the related term with use of a distributed representation vector that is obtained through machine learning of distributed representation of the words included in the plurality of pieces of first reference text analysis data.

It is preferable to extract the related term from the words included in the plurality of pieces of first reference text analysis data, on the basis of the similarity degree or the proximity of distance between distributed representation vectors of the words and a distributed representation vector of the keyword. It is preferable that the distributed representation vector of the word be a vector generated with use of a neural network.

The function of extracting a keyword included in text data preferably includes a function of performing morphological analysis on the text data to generate analysis data and a function of extracting the keyword from the analysis data. It is preferable that the keyword be extracted from words included in the analysis data, on the basis of the level of an inverse document frequency in the plurality of pieces of first reference text analysis data or the plurality of pieces of second reference text analysis data.

It is preferable that changing the weight by a user is possible.

It is preferable that the first reference text analysis data be data generated by performing morphological analysis on first reference text data, and that the second reference text analysis data be data generated by performing morphological analysis on second reference text data.

The document search system of one embodiment of the present invention preferably includes an electronic device and a server. The electronic device includes a first communication portion. The server includes the processing portion and a second communication portion. The first communication portion has a function of supplying text data to the server through one or both of wire communication and wireless communication. The processing portion has a function of supplying ranking data to the second communication portion. The second communication portion has a function of supplying the ranking data to the electronic device through one or both of the wire communication and the wireless communication.

The processing portion may include a transistor containing a metal oxide in a channel formation region or a transistor containing silicon in a channel formation region.

Effect of the Invention

According to one embodiment of the present invention, a document search system that enables highly accurate document search can be provided. Alternatively, according to one embodiment of the present invention, a document search method that enables highly accurate document search can be provided. Alternatively, according to one embodiment of the present invention, highly accurate document search, especially for a document relating to intellectual property, can be achieved with an easy input method.

Note that the description of these effects does not preclude the existence of other effects. In one embodiment of the present invention, there is no need to achieve all the effects. Other effects can be derived from the description of the specification, the drawings, and the claims.

BRIEF DESCRIPTION OF THE DRAWINGS

FIG. 7(A) and (B) are diagrams illustrating an example of a document search method.

FIG. 10(A) and (B) are diagrams illustrating an example of a document search method.

MODE FOR CARRYING OUT THE INVENTION

Figure 1:
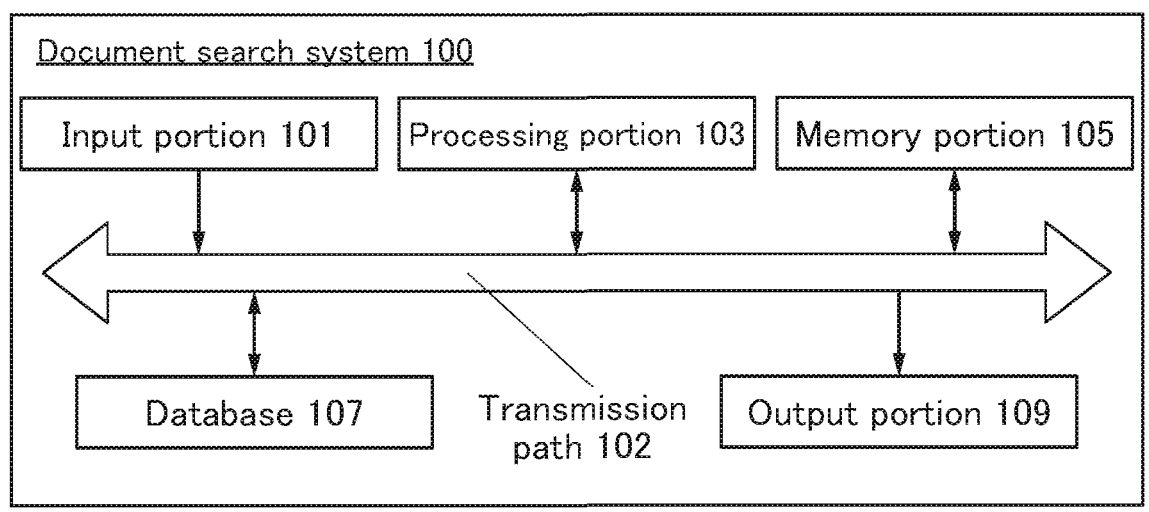
FIG. 1 A block diagram illustrating an example of a document search system.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments.

Note that in the structures of the present invention described below, the same portions or portions having similar functions are denoted by the same reference numerals in different drawings, and description thereof is not repeated. Furthermore, the same hatch pattern is used for the portions having similar functions, and the portions are not especially denoted by reference numerals in some cases.

In addition, the position, size, range, or the like of each structure illustrated in drawings does not represent the actual position, size, range, or the like in some cases for easy understanding. Therefore, the disclosed invention is not necessarily limited to the position, size, range, or the like disclosed in the drawings.

Note that the term "film" and the term "layer" can be interchanged with each other depending on the case or circumstances. For example, the term "conductive layer" can be changed into the term "conductive film". As another example, the term "insulating film" can be changed into the term "insulating layer".

Embodiment 1

In this embodiment, a document search system and a document search method of one embodiment of the present invention will be described with reference to FIG. 1 to FIG. 11.

One embodiment of the present invention is a document search system including a processing portion. The processing portion has a function of extracting a keyword included in text data, a function of extracting a related term of the keyword from words included in a plurality of pieces of first reference text analysis data, a function of giving a weight to each of the keyword and the related term, a function of giving a score to each of a plurality of pieces of second reference text analysis data on the basis of the weight, a function of ranking the plurality of pieces of second reference text analysis data on the basis of the score to generate ranking data, and a function of outputting the ranking data.

In the document search system of one embodiment of the present invention, the related term of the keyword can be extracted with use of the first reference text analysis data, and the second reference text analysis data can be searched for data related or similar to the text data.

The first reference text analysis data and the second reference analysis data may be the same. In this case, the document search system of one embodiment of the present invention enables the related term of the keyword to be extracted using the reference text analysis data that is to be searched. The first reference text analysis data may include part or whole of the second reference text analysis data.

In other words, the processing portion included in the document search system of one embodiment of the present invention may have a function of extracting a keyword included in text data, a function of extracting a related term of the keyword from words included in a plurality of pieces of reference text analysis data, a function of giving a weight to each of the keyword and the related term, a function of giving a score to each of the plurality of pieces of reference text analysis data on the basis of the weight, a function of ranking the plurality of pieces of reference text analysis data on the basis of the score to generate ranking data, and a function of outputting the ranking data.

When a user selects a keyword used for a search in the document search system, the user has to select the keyword used for a search considering not only the keyword itself but also synonyms, fluctuation of description, and the like. Thus, it is hard for the user to select the keyword, and a difference depending on users' skills is likely to occur in the keyword selection. In addition, it is also hard for the user to find out a necessary document from a large number of documents output by the document search system.

In this point, the document search system of one embodiment of the present invention has a function of extracting a keyword included in text data and a related term of the keyword. Thus, a user of the document search system of one embodiment of the present invention does not need to select the keyword used for a search by him-or-her-self. The text data with higher volume than the keyword can be directly input to the document search system by the user. Furthermore, in the case where the keyword and the related term are desirably selected by the user, there is no need to start the selection operation at the beginning; the user may conduct addition, modification, deletion, or the like on keywords and related terms with reference to the keyword and the related term extracted by the document search system. Thus, it is possible to relieve the difficulty for the user in the document search, and a difference in search results depending on users' skills can be less likely to occur.

In particular, the document search system of one embodiment of the present invention has a function of extracting a related term of the keyword from words included in a plurality of pieces of reference text analysis data. In the case where a related term of the keyword from words included in an existing conceptual dictionary, it is sometimes difficult to extract a unique notation, as a related term, included in data that is to be searched. By contrast, in one embodiment of the present invention, a related term of the keyword is extracted from words included in data prepared for extracting the related term of the keyword (first reference text analysis data) or data subjected to be searched (second reference text analysis data). Thus, extracting the unique notation as a related term becomes easy, which is preferable because omission in searches is inhibited.

Furthermore, the document search system of one embodiment of the present invention has a function of giving a weight to each of the extracted keyword and the related term. When each of the keyword and the related term has a weight, the reference text analysis data where the keyword or the related term is hit can be scored on the basis of the weight. Moreover, the document search system of one embodiment of the present invention has a function of generating ranking data by ranking, on the basis of the score, the reference text analysis data that is subjected to be searched and a function of outputting the ranking data. Since search results that have been ranked with the relevance or similarity degree are output, it is easy for the user to search a necessary document from the research results, which increases the work efficiency and less causes oversight. As described above, the document search system of one embodiment of the present invention enables a search of documents easily and accurately.

The weight of the keyword is preferably a value based on an inverse document frequency (hereinafter, referred to as IDF) in the plurality of pieces of first or second reference text analysis data of the keyword. The IDF indicates a low frequency in which one word is likely to appear in a document. The IDF of a word that appears in many documents is low, and the IDF of a word that appears only in a few documents is high. Thus, the word with a high IDF can be regarded as a characteristic word in the first or second reference text analysis data.

Keyword extraction itself from text data can be conducted on the basis of IDF in the plurality of pieces of first or second reference text analysis data of words in the text data. For example, a word whose IDF is higher than or equal to a certain value may be extracted as a keyword, or a given number of words that are listed in a descending order of IDF may be extracted as keywords.

A keyword may be extracted on the basis of IDF in either the first reference text analysis data or the second reference text analysis data. It is preferable to extract a keyword from the text data on the basis of IDF in the second reference text analysis data that is subjected to be searched because it is easier to extract a characteristic word in the text to be searched. Note that it is easier to extract a keyword from the text data in some cases by extracting the keyword on the basis of IDF in the first reference text analysis data, for example in the case of a small number of documents subjected to be searched.

Alternatively, a keyword may be extracted on the basis of information on parts of speech of words obtained by morphological analysis of text data input by the user. For example, in the case where Japanese text is morphologically analyzed, a noun is preferably extracted. In the case where English text is morphologically analyzed, an adjective, a noun, and a verb are preferably extracted.

Examples of related terms include synonyms, antonyms, broader terms, and narrower terms. The related term is preferably extracted from words included in a plurality of pieces of reference text analysis data on the basis of the similarity degree or the proximity of distance between distributed representation vectors of the words and a distributed representation vector of the keyword. As for the keyword included in the text data input by the user, synonyms or the like included in the reference text analysis data can be extracted as a related term. Thus, the search accuracy can be enhanced.

The weight of the related term is preferably a product of the weight of the keyword by a value based on the similarity degree or the distance between a distributed representation vector of the related term and the distributed representation vector of the keyword. The weight of the related term is set on the basis of both the relevance degree between the related term and the keyword and the weight of keyword itself, whereby the ranking accuracy can be further enhanced.

It is preferable to use artificial intelligence (AI) for at least part of processing of the document search system.

It is particularly preferable to use an artificial neural network (ANN; hereinafter just referred to as neural network) for the document search system. The neural network is obtained with a circuit (hardware) or a program (software).

For example, it is preferable to use machine learning, further preferable to use a neural network, when a distributed representation vector of a word is generated. Specifically, the related term is preferably extracted using a distributed representation vector obtained by machine learning performed on the distributed representation of words included in a plurality of pieces of reference text analysis data. Thus, the extraction of the related term and the weight of the related term can have high accuracy.

In this specification and the like, a neural network refers to a general model that is modeled on a biological neural network, determines the connection strength of neurons by learning, and has the capability of solving problems. A neural network includes an input layer, intermediate layers (hidden layers), and an output layer.

In the description of the neural network in this specification and the like, to determine a connection strength of neurons (also referred to as weight coefficient) from the existing information is referred to as "learning" in some cases.

In this specification and the like, to draw a new conclusion from a neural network formed with the connection strength obtained by learning is referred to as "inference" in some cases.

<1. Structure Example of Document Search System 1>

In this embodiment, a document search system that be used for a search for intellectual property is described as an example of the document search system. Note that not being limited to use of a search for intellectual property, the document search system of one embodiment of the present invention can be used for other searches than intellectual property.

FIG. 1 shows a block diagram of the document search system 100. Note that in the drawings attached to this specification, the block diagram in which components are classified according to their functions and shown as independent blocks is illustrated; however, it is difficult to separate actual components completely according to their functions, and it is possible for one component to relate to a plurality of functions. Moreover, one function can relate to a plurality of components; for example, two parts of processing conducted in a processing portion 103 can be executed on servers different from each other.

The document search system 100 includes at least the processing portion 103. The document search system 100 shown in FIG. 1 further includes an input portion 101, a transmission path 102, a memory portion 105, a database 107, and an output portion 109.

Input Unit 101

To the input portion 101, data is supplied from the outside of the document search system 100. The data supplied to the input portion 101 is supplied to the processing portion 103, the memory portion 105, or the database 107 through the transmission path 102.

Transmission Path 102

The transmission path 102 has a function of transmitting data. The data transmission and reception among the input portion 101, the processing portion 103, the memory portion 105, the database 107, and the output portion 109 can be performed through the transmission path 102.

Processing Portion 103

The processing portion 103 has a function of performing calculation, inference, or the like with use of the data supplied from the input portion 101, the memory portion 105, the database 107, or the like. The processing portion 103 can supply a calculation result, an inference result, or the like to the memory portion 105, the database 107, the output portion 109, or the like.

A transistor whose channel formation region contains a metal oxide is preferably used in the processing portion 103. The transistor has an extremely low off-state current; therefore, with use of the transistor as a switch for holding electric charge (data) which flows into a capacitor functioning as a memory element, a long data retention period can be ensured. When at least one of a register and a cache memory included in the processing portion 103 has such a feature, the processing portion 103 can be operated only when needed, and otherwise can be off while information processed immediately before turning off the processing portion 103 is stored in the memory element; accordingly, normally-off computing is possible and the power consumption of the document search system can be reduced.

In this specification and the like, a transistor including an oxide semiconductor or a metal oxide in its channel formation region is referred to as an oxide semiconductor transistor or an OS transistor. A channel formation region of an OS transistor preferably includes a metal oxide.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is to say, in the case where a metal oxide has at least one of an amplifying function, a rectifying function, and a switching function, the metal oxide can be called a metal oxide semiconductor, or OS for short.

The metal oxide included in the channel formation region preferably contains indium (In). When the metal oxide included in the channel formation region is a metal oxide containing indium, the carrier mobility (electron mobility) of the OS transistor increases. The metal oxide included in the channel formation region is preferably an oxide semiconductor containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that it is sometimes acceptable to use a plurality of the above-described elements in combination as the element M. The element M is an element having high bonding energy with oxygen, for example. The element M is an element having higher bonding energy with oxygen than indium, for example. The metal oxide included in the channel formation region is preferably a metal oxide containing zinc (Zn). The metal oxide containing zinc is easily crystallized in some cases.

The metal oxide included in the channel formation region is not limited to a metal oxide containing indium. The semiconductor layer may be a metal oxide that does not contain indium and contains zinc, a metal oxide that contains gallium, a metal oxide that contains tin, or the like, e.g., zinc tin oxide or gallium tin oxide.

Furthermore, a transistor including silicon in a channel formation region may be used in the processing portion 103.

In the processing portion 103, a transistor including an oxide semiconductor in a channel formation region and a transistor including silicon in a channel formation region are preferably used in combination.

The processing portion 103 includes, for example, an arithmetic circuit, a central processing unit (CPU), or the like.

The processing portion 103 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing portion 103 can interpret and execute instructions from various programs with use of a processor to process various kinds of data and control programs. The programs to be executed by the processor are stored in at least one of a memory region of the processor and the memory portion 105.

The processing portion 103 may include a main memory. The main memory includes at least one of a volatile memory such as a RAM (Random Access Memory) and a nonvolatile memory such as a ROM (Read Only Memory).

For example, a DRAM (Dynamic Random Access Memory), an SRAM (Static Random Access Memory), or the like is used as the RAM, and a memory space is virtually assigned as a work space for the processing portion 103 and used. An operating system, an application program, a program module, program data, a look-up table, and the like which are stored in the memory portion 105 are loaded into the RAM for execution. The data, program, and program module which are loaded into the RAM are each directly accessed and operated by the processing portion 103.

In the ROM, a BIOS (Basic Input/Output System), firmware, and the like for which rewriting is not needed can be stored. As examples of the ROM, a mask ROM, an OTPROM (One Time Programmable Read Only Memory), an EPROM (Erasable Programmable Read Only Memory), and the like can be given. As the EPROM, a UV-EPROM (Ultra-Violet Erasable Programmable Read Only Memory) which can erase stored data by ultraviolet irradiation, an EEPROM (Electrically Erasable Programmable Read Only Memory), a flash memory, and the like can be given.

Memory Portion 105

The memory portion 105 has a function of storing a program to be executed by the processing portion 103. The memory portion 105 may have a function of storing a calculation result and an inference result generated by the processing portion 103, data input to the input portion 101, and the like.

The memory portion 105 includes at least one of a volatile memory and a nonvolatile memory. For example, the memory portion 105 may include a volatile memory such as a DRAM or an SRAM. For example, the memory portion 105 may include a nonvolatile memory such as an ReRAM (Resistive Random Access Memory), a PRAM (Phase change Random Access Memory), an FeRAM (Ferroelectric Random Access Memory), or a MRAM (Magnetoresistive Random Access Memory), or a flash memory. The memory portion 105 may include a storage media drive such as a hard disk drive (HDD) or a solid state drive (SSD).

Database 107

The database 107 has a function of storing at least reference text analysis data that is to be searched, IDF data, and a vector data. The database 107 may have a function of storing a calculation result and an inference result generated by the processing portion 103 and data input to the input portion 101. Note that the memory portion 105 and the database 107 are not necessarily separated from each other. For example, the document search system may include a storage unit that has both the functions of the memory portion 105 and that of the database 107.

Output Portion 109

The output portion 109 has a function of supplying data to the outside of the document search system 100. For example, a calculation result, an inference result, or the like in the processing portion 103 can be supplied to the outside.

2. Document Search Method

Figure 2:
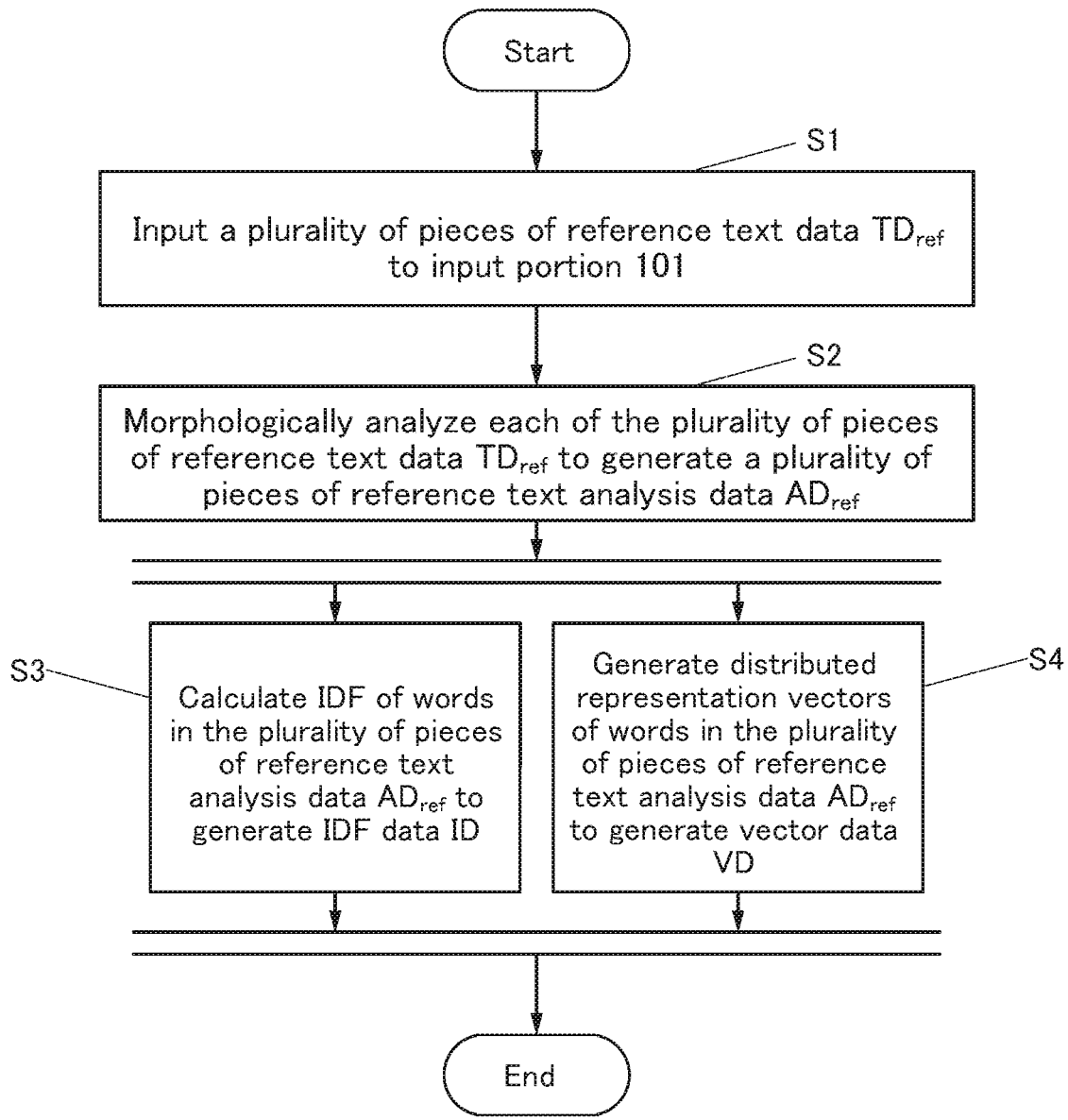
FIG. 2 A flow chart illustrating an example of a method for generating search data.

First, processing conducted in advance for a search using the document search system 100 is described with reference to FIG. 2 and FIG. 3. FIG. 2 shows a flow chart, and FIG. 3 shows schematic diagrams illustrating steps shown in FIG. 2. Note that the illustration of data shown in FIG. 3 is just an example, and the data is not limited thereto.

The description below gives an example where reference text data used to extract a related term of a keyword is the same as reference text data that is to be searched (referred to as reference text data $TD_{ref}$). As mentioned above, the reference text data may be different depending on the two uses. For example, first reference text data may be used to generate vector data VD (described later), and second reference text data may be searched. In this case, IDF data ID described later may be generated with use of the first reference text data or the second reference text data.

Step S1

Figure 3A:
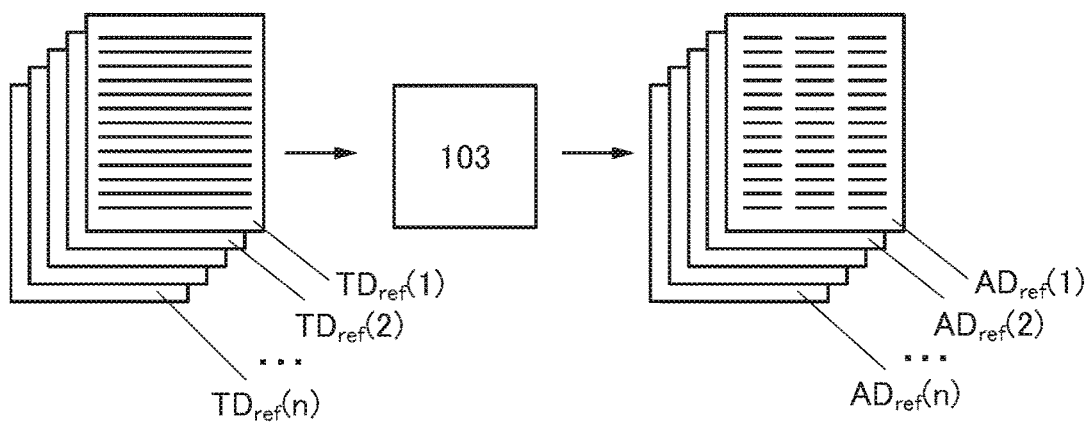
FIG. 3(A) to (C) are diagrams illustrating an example of a method for generating search data.

First, a plurality of pieces of reference text data $TD_{ref}$ are input to the input portion 101 (FIG. 2 and FIG. 3(A)).

In the document search method of this embodiment, a plurality of documents prepared in advance can be searched for a document that is related or similar to the input document. The reference text data $TD_{ref}$ is text data of the document that is to be searched in the document search system 100. Data used as the reference text data $TD_{ref}$ can be chosen as appropriate depending on usage of the document search system 100.

The reference text data $TD_{ref}$ is input to the input portion 101 from the outside of the document search system 100. Then the reference text data $TD_{ref}$ is supplied from the input portion 101 to the processing portion 103 through the transmission path 102. Alternatively, the reference text data $TD_{ref}$ transmitted from the input portion 101 through the transmission path 102 may be stored in the memory portion 105 or the database 107, and may be supplied from the memory portion 105 or the database 107 to the processing portion 103 through the transmission path 102.

FIG. 3(A) illustrates n (n is an integer greater than or equal to 2) pieces of the reference text data $TD_{ref}$ and each of them is denoted as data $TD_{ref}(x)$ (x is an integer greater than or equal to 1 and less than or equal to n).

This embodiment shows an example in which a document relating to intellectual property is to be searched. The reference text data $TD_{ref}$ is text data relating to intellectual property.

As described above, the reference text data input in Step S1 is different from data that is to be searched in some cases. The reference text data input in Step S1 is preferably text data of a document relating to intellectual property; however, it is not limited thereto. Part of the reference text data input in Step S1 is data that is to be searched in some cases. For example, the reference text data input in Step S1 may be text data of patent documents and papers, and only text data of the patent documents may be subjected to be search.

Here, specific examples of documents relating to intellectual property include publications such as a patent document (e.g., published application publication, and a patent publication), a utility model publication, a design publication, and a paper. Not only publications issued domestically but also those issued in foreign countries can be used as the documents relating to intellectual property.

Each of the specification, claims, and abstract of a patent document can be partly or wholly used as the reference text data $TD_{ref}$. For example, an embodiment for carrying out a certain invention, an example, or a claim can be used as the reference text data $TD_{ref}$. Similarly, the text in another kind of publication such as a paper can be partly or wholly used as the reference text data $TD_{ref}$.

The document relating to intellectual property is not limited to publications. For example, text files owned by an individual or group of users can be used as the reference text data $TD_{ref}$.

Furthermore, examples of documents relating to intellectual property include sentences describing inventions, devices, industrial design or industrial products.

The reference text data $TD_{ref}$ can include, for example, patent documents of a certain applicant or patent documents in a certain technical field.

The reference text data $TD_{ref}$ can include not only the description of an intellectual property itself (e.g., the specifications, or the like) but also various kinds of information relating to the intellectual property (e.g., bibliographic information). As the information, for example, the applicant, technical field, application number, publication number, current status (pending, patented, abandoned, or the like), or the like can be included.

The reference text data $TD_{ref}$ preferably includes the date information of an intellectual property. In case where the intellectual property is in the form of a patent document, the date information can include, for example, the filing date, publication date, issue date, or the like; in case where the intellectual property is technical information on an industrial product, the date information can include, for example, the launch date.

In this way, the reference text data $TD_{ref}$ can include various kinds of information on intellectual properties, so that various search scopes are selectable in the document search system.

For example, a patent document, a paper, or an industrial product that is related or similar to an invention before filing can be searched for with use of the document search system of this embodiment. Thus, prior art relating to the invention before filing can be searched for. Knowing and reviewing relevant prior art strengthens the invention, leading to a strong patent that other companies are highly likely to infringe.

For example, a patent document, a paper, or an industrial product that is related or similar to an industrial product before sale can be searched for with the document search system of this embodiment. When the reference text data $TD_{ref}$ includes one's own patent documents, the one can confirm whether patent applications are appropriately filed in association with technologies for the one's own industrial product before sale. Alternatively, when the reference text data $TD_{ref}$ includes information on intellectual properties of others, the one can confirm whether or not the one's own industrial product before sale infringes the others' intellectual property right. Knowing and reviewing technologies relating to the industrial product before sale leads to discovery of a novel invention that is to be a strong patent contributing to one's own business. Search for an industrial product after sale may be conducted as well as search for an industrial product before sale.

For example, a patent document, a paper, or an industrial product that is related or similar to a certain patent can be searched for with the document search system of this embodiment. In particular, search based on the filing date of the certain patent can reveal easily and accurately whether or not the patent includes grounds for invalidation.

Step S2

Next, morphological analysis is conducted on each of the plurality of pieces of reference text data $TD_{ref}$, so that a plurality of pieces of reference text analysis data $AD_{ref}$ are generated (FIG. 2 and FIG. 3(A)).

In the processing portion 103, n pieces of the reference text data $TD_{ref}$ are each morphologically analyzed, so that n pieces of reference text analysis data $AD_{ref}$ (each of them is referred to as reference text analysis data $AD_{ref}(x)$ (x is an integer greater than or equal to 1 and less than or equal to n)) are generated. For example, the reference text data $TD_{ref}(n)$ is morphologically analyzed, so that reference text analysis data $AD_{ref}(n)$ is generated.

In the morphological analysis, text written in a natural language is divided into morphemes (smallest meaningful units in a language), and parts of speech in the morphemes can be distinguished. Thus, only nouns, for example, can be extracted from the reference text data $TD_{ref}$.

In FIG. 3A, the input reference text data $TD_{ref}(1)$ includes a long sentence; in the output reference text analysis data $AD_{ref}(1)$, the sentence is separated into a plurality of words.

FIG. 3(A) shows an example where the generated reference text analysis data $AD_{ref}$ is output to the outside of the processing portion 103. For example, the processing portion 103 can supply a plurality of pieces of reference text analysis data $AD_{ref}$ to the database 107. Note that the processing portion 103 may generate and output a corpus in which the plurality of pieces of reference text analysis data $AD_{ref}$ are integrated into one piece of data.

As well as Japanese text, texts in various languages (e.g., English, Chinese, and Korean) can be analyzed. Various text analysis methods can be used depending on languages.

Step S3

Figure 3B:
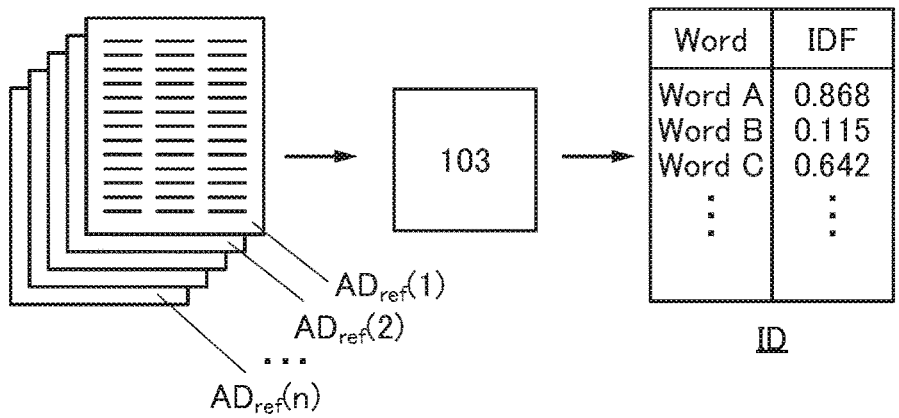

After Step S2, IDF of words included in the plurality of pieces of reference text analysis data $AD_{ref}$ is calculated, so that IDF data ID is generated (FIG. 2 and FIG. 3(B)). Here, IDF is preferably normalized.

The reference text analysis data $AD_{ref}$ is supplied from the database 107 to the processing portion 103 through the transmission path 102.

In the processing portion 103, IDF of words included inn pieces of reference text analysis data $AD_{ref}$ is calculated and normalized, so that IDF data ID is generated.

As illustrated in FIG. 3(B), the IDF data ID includes words (Word) and normalized IDF.

IDF(t) of a certain word t can be calculated by normalizing idf(t) of Formula (1). There is no particularly limitation on a normalization method, and for example, the idf(t) can be normalized according to Formula (2). In Formula (1), N denotes the total number of documents (the quantity of reference text analysis data $AD_{ref}$, equal to the above n), and df(t) denotes the number of documents (the quantity of reference text analysis data $AD_{ref}$) where the word t appears. In Formula (2), $idf_{MAX}$ denotes the maximum value of idf(t) of the word included in the reference text analysis data $AD_{ref}$, and $idf_{MN}$ is the minimum value of idf(t) of the word included in the reference text analysis data $AD_{ref}$.

[Formula 1]

$$idf(t) = \log \frac{N}{df(t)} \quad (1)$$

$$IDF(t) = \frac{idf(t) - idf_{MIN}}{idf_{MAX} - idf_{MIN}} \quad (2)$$

For example, the normalized IDF of Word A is 0.868, the normalized IDF of Word B is 0.115, and the normalized IDF of Word C is 0.642, which suggests that Word A has higher IDF than Word B and Word C and is a characteristic word less likely to appear in the reference text analysis data $AD_{ref}$. Although FIG. 3(B) shows an example in which the words are listed in alphabetical order, the listing order is not limited to this, and the words may be listed in a descending order of IDF.

FIG. 3(B) illustrates an example in which the generated IDF data ID is output to the outside of the processing portion 103. For example, the processing portion 103 enables the IDF data ID to be supplied to the database 107 through the transmission path 102.

Step S4

Figure 3C:
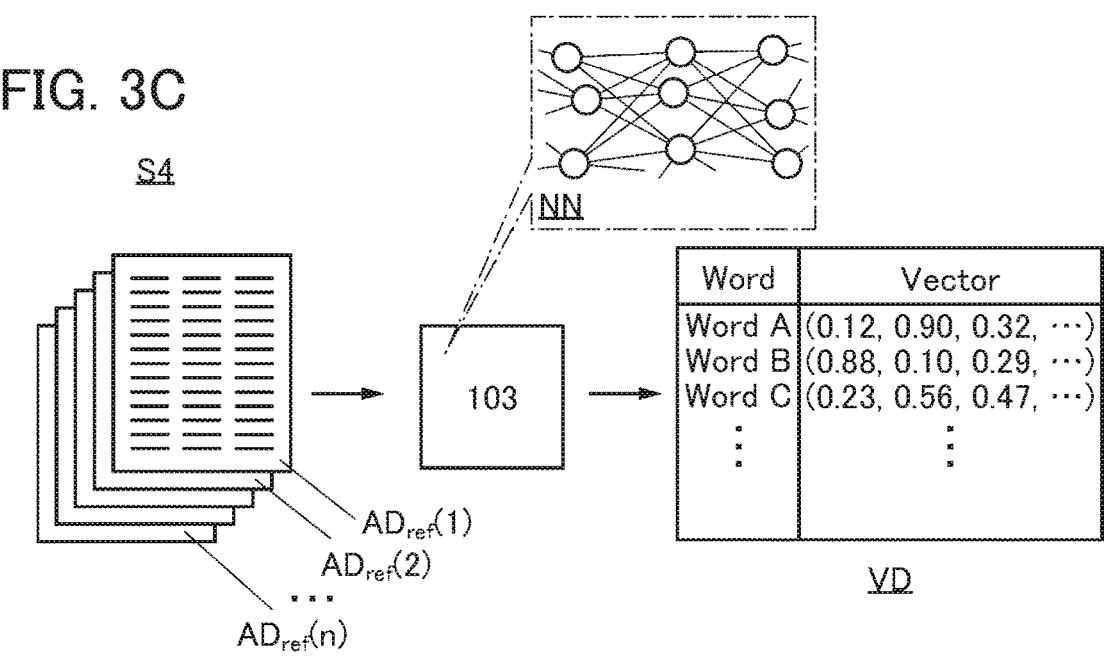

After Step S2, distributed representation vectors of the words included in the plurality of pieces of reference text analysis data $AD_{ref}$ are generated, so that vector data VD is generated (FIG. 2 and FIG. 3(C)).

Either Step S3 or Step S4 may be performed first, or both of them may be performed in parallel.

In the processing portion 103, distributed representation vectors of words included in n pieces of reference text analysis data $AD_{ref}$ are generated, so that the vector data VD is generated.

The distributed representation of the word is also referred to as word embedding. The distributed representation vector of the word is a vector represented with continuous values quantified with respect to characteristic elements (dimensions). Vectors of words with meanings similar to each other become close to each other.

As illustrated in FIG. 3(C), the distributed representation vector of the word is preferably generated in the processing portion 103 with use of a neural network NN.

Here, an example of a method for generating a distributed representation vector of a word with use of a neural network NN is described. Learning of the neural network NN is conducted with supervised learning. Specifically, one word is given to an input layer, and surrounding words of the word are given to an output layer, thereby having the neural network NN learn the probability of the surrounding words to the word. It is preferable for a middle layer (hidden layer) to include relatively low-dimensional vectors whose dimension number is greater than or equal to 10 and less than or equal to 1000. The vector after learning is the distributed representation vector.

The distributed representation of the word can be created using an opened-sourced algorithm Word2vec, for example. Word2vec allows words to be vectorized considering characteristics and meaning structures of the words, on the assumption that words used in the same context have the same meaning.

In terms of vectorization of the words, the distributed representation vector of the word is generated, whereby it is possible to calculate the similarity degree or the distance between the words with calculation of the vectors. When the similarity degree between two vectors is high, the two vectors can be regarded as having high relations. Alternatively, when the distance between two vectors is small, the two vectors can be regarded as having high relations.

Whereas one dimension is assigned to one word in the one-hot representation, words can be represented by low-dimensional real-valued vectors in the distributed representation, which enables the words to be represented with a small number of dimensions even when the volume of vocabulary is increased. Thus, the amount of calculations is less likely to increase even when the number of words included in a corpus is large, and an enormous quantity of data can be processed in a short time.

As illustrated in FIG. 3(C), Vector VD includes words (Word) and vectors (Vector). For example, Vector of Word A is (0.12, 0.90, 0.32, . . . ), Vector of Word B is (0.88, 0.10, 0.29, . . . ), and Vector of Word C is (0.23, 0.56, 0.47, . . . ).

FIG. 3(C) illustrates an example in which the generated vector data VD is output to the outside of the processing portion 103. For example, the processing portion 103 enables the vector data VD to be supplied to the database 107.

The above steps are performed to generate the reference text analysis data $AD_{ref}$, the IDF data ID, and the vector data VD in advance, whereby documents can be searched for with use of the document search system 100.

Although this embodiment shows the example in which the reference text analysis data $AD_{ref}$, the IDF data ID, and the vector data VD are generated with use of the document search system 100, at least one of the reference text analysis data $AD_{ref}$, the IDF data ID, and the vector data VD may be generated in the outside of the document search system 100. In this case, the data generated outside is input to the input portion 101 and stored in the database 107 of the document search system 100, whereby a search using the document search system 100 becomes possible.

Next, a search method using the document search system 100 is described. FIG. 4, FIG. 5, FIG. 8, and FIG. 9 each show a flow chart, and FIG. 6, FIG. 7(A), and FIG. 10 show schematic diagrams corresponding to steps in the flow chart. Note that the illustration of data shown in FIG. 6, FIG. 7(A), and FIG. 10 is just an example, and the data is not limited thereto.

[Step S11]

Figure 4:
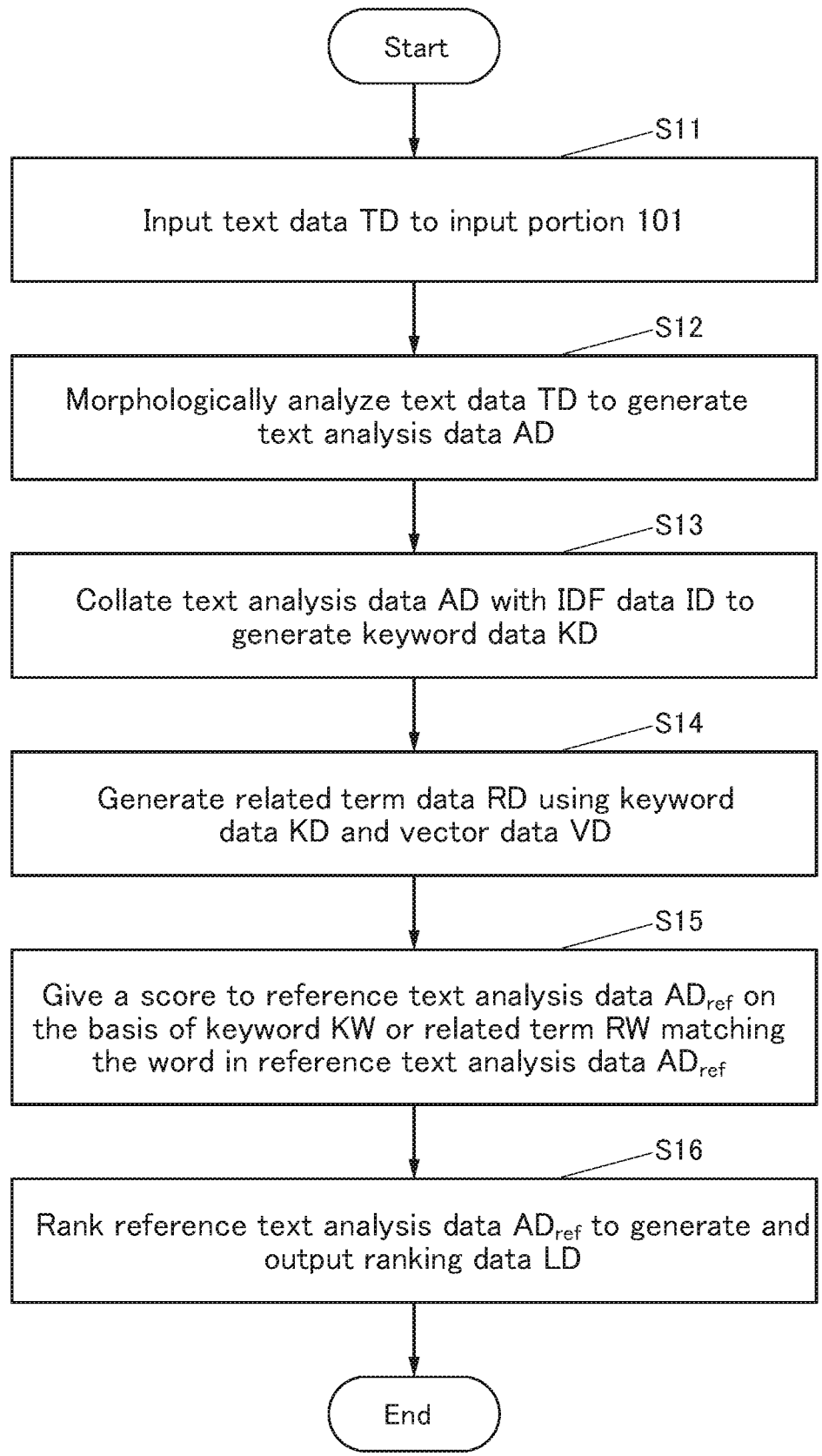
FIG. 4 A flow chart illustrating an example of a document search method.
Figure 5:
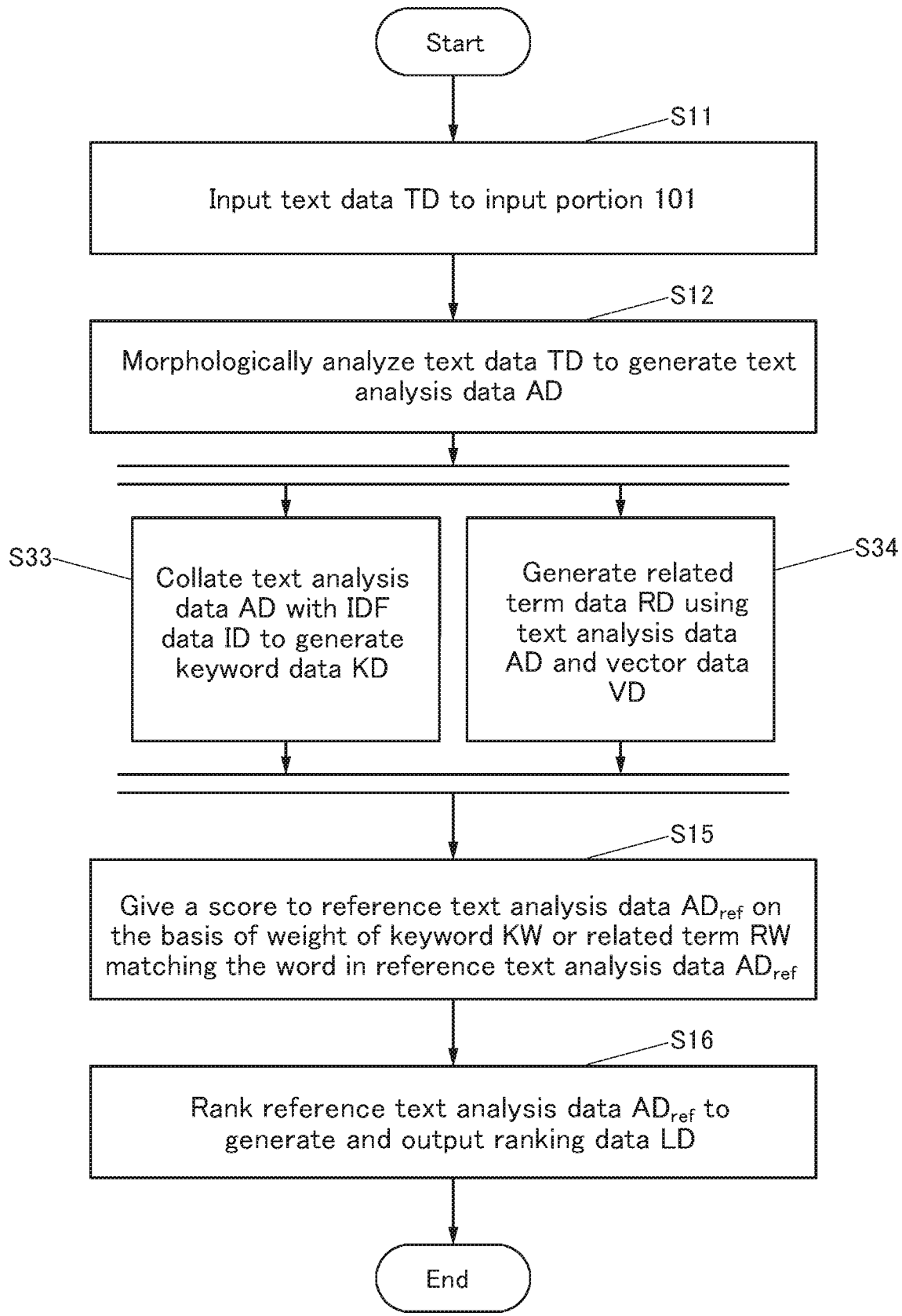
FIG. 5 A flow chart illustrating an example of a document search method.
Figure 6A:
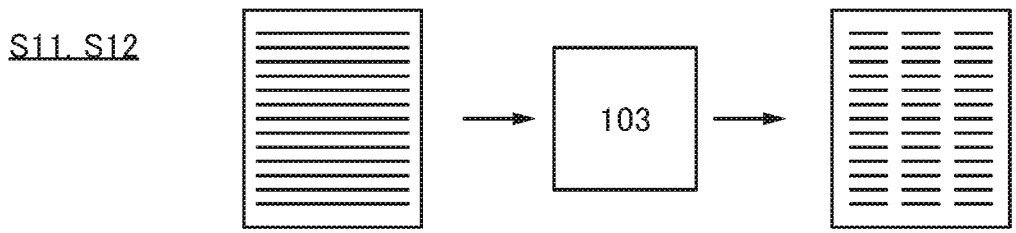
FIG. 6(A) to (C) are diagrams illustrating an example of a document search method.

First, text data TD is input to the input portion 101 (FIG. 4, FIG. 5, and FIG. 6(A)).

In the document search method in this embodiment, the reference text data $TD_{ref}$ can be searched for text data related or similar to the test data TD.

The text data TD is input to the input portion 101 from the outside of the document search system 100. Then the text data TD is supplied from the input portion 101 to the processing portion 103 through the transmission path 102. Alternatively, the text data TD transmitted through the transmission path 102 may be stored in the memory portion 105 or the database 107, and supplied from the memory portion 105 or the database 107 to the processing portion 103 through the transmission path 102.

This embodiment shows an example in which a target for a search is a document relating to intellectual property. The text data TD is data of a document relating to intellectual property. Examples of documents relating to intellectual property are described above.

The text data TD can include, for example, sentences describing inventions, devices, designs, industrial products before filing or sale, technical information, or technical thought.

In particular, it is possible to use sentences describing claims, abstract, or summary of the invention of a patent document as the text data TD as appropriate. Such text data TD whose text volume is relative low (lower than the full text of the specification) is preferable because characteristic keywords included in the text data TD are easily extracted. With the document search system of this embodiment, the related term of the characteristic keyword can be extracted, and thus, high-accurate search can be performed even when the volume of vocabulary is low.

Step S12

Next, morphological analysis is conducted on the text data TD, so that text analysis data AD is generated (FIG. 4, FIG. 5, and FIG. 6(A)).

The processing portion 103 conducts morphological analysis on the text data TD, thereby generating the text analysis data AD.

In FIG. 6(A), the input text data TD includes a long sentence; in the output text analysis data AD is separated into a plurality of words.

FIG. 6(A) illustrates an example in which the generated text analysis data AD is output to the outside of the processing portion 103. For example, the processing portion 103 enables the text analysis data AD to be supplied to the memory portion 105 or the database 107.

Step S13, S33

Figure 6B:
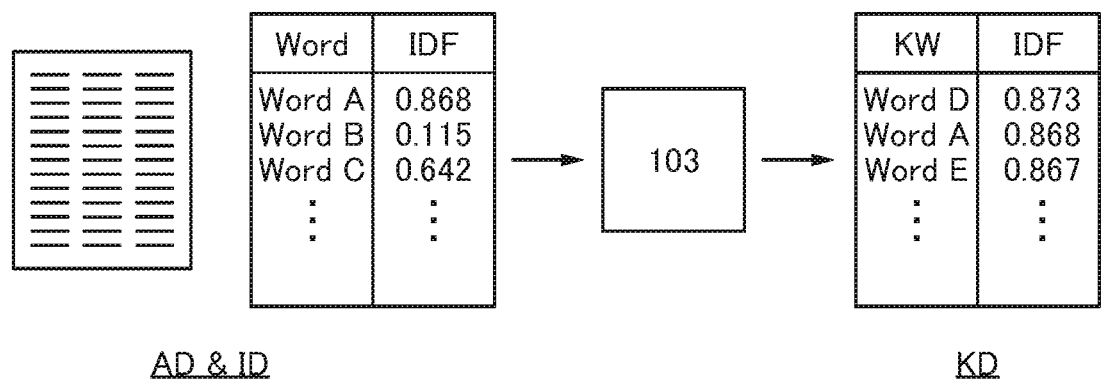

Next, the text analysis data AD is collated with the IDF data ID, so that keyword data KD is generated (FIG. 4, FIG. 5, and FIG. 6(B)).

The text analysis data AD is supplied from the memory portion 105 or the database 107 to the processing portion 103 through the transmission path 102. The IDF data ID is supplied from the database 107 to the processing portion 103 through the transmission path 102.

In the processing portion 103, the text analysis data AD is collated with the IDF data ID, and words included in the text analysis data AD are listed in a descending order of IDF, so that keyword data KD is generated.

The keyword data KD includes a keyword KW and its IDF. Here, an example in which normalized IDF is used is shown.

The keyword KW can be referred to as a specific word included in the text analysis data AD. The keyword KW may be all of words included in both the text analysis data AD and the IDF data ID, some words whose IDF is equal to or higher than a predetermined value, or a predetermined number of words highly ranked in IDF. The criteria for keyword KW extraction is preferably set in accordance with the text volume of the text data TD. For example, the number of keywords KW is preferably greater than or equal to 2 and less than or equal to 100, further preferably greater than or equal to 5 and less than equal to 30.

Here, normalized IDF of the keyword KW corresponds to a weight of the keyword KW that is used to give a score to the reference text analysis data $AD_{ref}$ in a later step.

FIG. 6(B) illustrates an example in which the weight of Word D is 0.873, the weight of Word A is 0.868, and the weight of Word E is 0.867.

FIG. 6(B) illustrates an example in which the keyword data KD is output to the outside of the processing portion 103. For example, the processing portion 103 enables the keyword data KD to be supplied to the memory portion 105 or the database 107 through the transmission path 102.

Step S14, S34

Figure 6C:
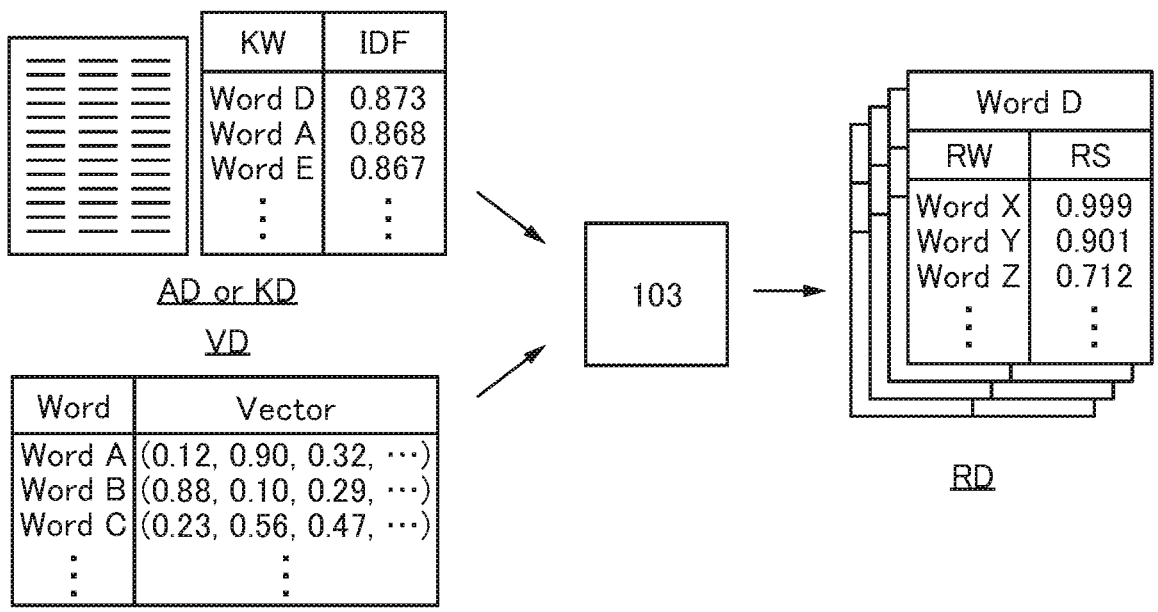

Next, with use of the text analysis data AD or the keyword data KD, and the vector data VD, related term data RD is generated (FIG. 4, FIG. 5, and FIG. 6(C)).

The text analysis data AD or the keyword data KD is supplied from the memory portion 105 or the database 107 to the processing portion 103 through the transmission path 102. The vector data VD is supplied from the database 107 to the processing portion 103 through the transmission path 102.

In the case of Step S14, the processing portion 103 extracts related terms RW of the keyword KW on the basis of the similarity degree or the proximity of distance between distributed representation vectors of the keywords KW and the distributed representation vectors of the words included in the reference text analysis data $AD_{ref}$. Then, the related terms RW are listed in the descending order of the similarity degree or in the descending order of the proximity, so that the related term data RD is generated. Specifically, the number of extracted related terms RW with respect to one keyword KW is preferably greater than or equal to 1 and less than or equal to 10, further preferably greater than or equal to 2 and less than or equal to 5. The related term RW may be a word whose similarity degree is higher than or equal to a predetermined value, a word whose distance is smaller than or equal to a predetermined value, a predetermined number of words highly ranked in the similarity degree, or a predetermined number of words highly ranked in the proximity, for example. The number of synonyms, antonyms, broader terms, narrower terms, and the like varies depending on the keyword KW; accordingly, the number of related terms RW may differ depending on the keyword KW. The related term RW of the keyword KW is extracted from the words included in the reference text analysis data $AD_{ref}$, whereby even when the keyword KW is represented as a unique notation by the reference text analysis data $AD_{ref}$, the notation can be extracted as the related term RW. Therefore, the above extraction is preferable because omission in searches due to fluctuation of description can be inhibited.

In the case of S34, the processing portion 103 extracts the related term RW on the basis of the similarity degree or the proximity of distance between the distributed representation vectors of the words in the text analysis data AD and the distributed representation vectors of the words included in the reference text analysis data $AD_{ref}$. Otherwise, it is the same as Step S14.

The similarity degree of two vectors can be calculated with use of the cosine similarity, the covariance, the unbiased covariance, Pearson's correlation coefficient, or the like. In particular, the cosine similarity is preferably used.

The distance between two vectors can be calculated with use of Euclidean distance, Standard (standardized, average) Euclidean distance, Mahalanobis distance, Manhattan distance, Chebyshev distance, Minkowski distance, or the like.

The related term data RD includes the related term RW and its relevance degree RS.

It can be said that the related term RW is a word included in the text analysis data AD or a word related to the keyword KW.

The relevance degree RS is a value representing the above similarity degree or proximity of distance or its normalized value. The relevance value RS is used to calculate a weight of the related term that is used for giving a score to the reference text analysis data $AD_{ref}$ in a later step. Specifically, a product of the normalized IDF of the keyword KW by the relevance degree RS of the related term RW corresponds to a weight of the related term.

FIG. 6(C) illustrates an example in which Word X (the relevance degree RS is 0.999), Word Y (the relevance degree RS is 0.901), and Word Z (the relevance degree RS is 0.712) are extracted as the related terms RW of Word D, in the descending order of the relevance degree RS.

FIG. 6(C) illustrates an example in which the related term data RD is output to the outside of the processing portion 103. For example, the processing portion 103 enables the related term data RD to be supplied to the memory portion 105 or the database 107 through the transmission path 102.

Note that when the related term is extracted using the keyword data KD, Step S14 is performed after Step S13 as shown in FIG. 4. On the other hand, when the related term is extracted using the text analysis data AD, either Step S33 or Step S34 may be performed first or both of them may be performed in parallel as shown in FIG. 5.

In addition, a step of determining a weight of the related term RW through determination whether the related term RW is a word included in a conceptual dictionary may be included. When the related term RW is included in the conceptual dictionary, it can be said that the related term RW has high relevance to the keyword KW. Thus, the weight of the related term RW in the case of being included in the conceptual dictionary may be set higher than that in the case of not being included. For example, as the weight of the related term RW, the following value may be used in accordance with a determination result: a value obtained by adding or subtracting a predetermined value to/from a value representing the similarity degree or proximity of distance. Alternatively, in one of the case where the related term RW is included in the conceptual dictionary and the case where being not included, a predetermined value may be used as the weight of the related term RW regardless of the similarity degree or proximity of distance. For example, in the case where the related term RW is included in the conceptual dictionary, the weight of the related term RW may be the same as the weight of the keyword KW.

Step S15

Next, a score is given to the reference text analysis data $AD_{ref}$ based on the weight of the keyword KW or the related term RW matching the word included in the reference text analysis data $AD_{ref}$ (FIG. 4, FIG. 5, and FIG. 7(A)).

The reference text analysis data $AD_{ref}$ is supplied from the database 107 to the processing portion 103 through the transmission path 102. The keyword data KD and the related term data RD are supplied from the memory portion 105 or the database 107 to the processing portion 103 through the transmission path 102. The processing portion 103 enables scoring results to be supplied to the memory portion 105 or the database 107 through the transmission path 102.

First, a specific example of scoring is described with reference to FIG. 7(B). FIG. 7(B) illustrates an example of using three types of keywords KW and four types of related terms RW with respect to one keyword KW.

A denominator of the score is a sum of weights of the keywords KW, and the dominator in the case of FIG. 7(B) is 0.9+0.9+0.8=2.6.

A numerator of the score is a sum of weights of the keywords KW or the related terms RW matching the word included in the reference text analysis data $AD_{ref}$, and the numerator in the case of FIG. 7(B) is 1.95, the weight sum of Word D, Word e, and Word f.

From the above, the score can be figured out as 1.95/2.6=0.75 (75%).

Figure 8:
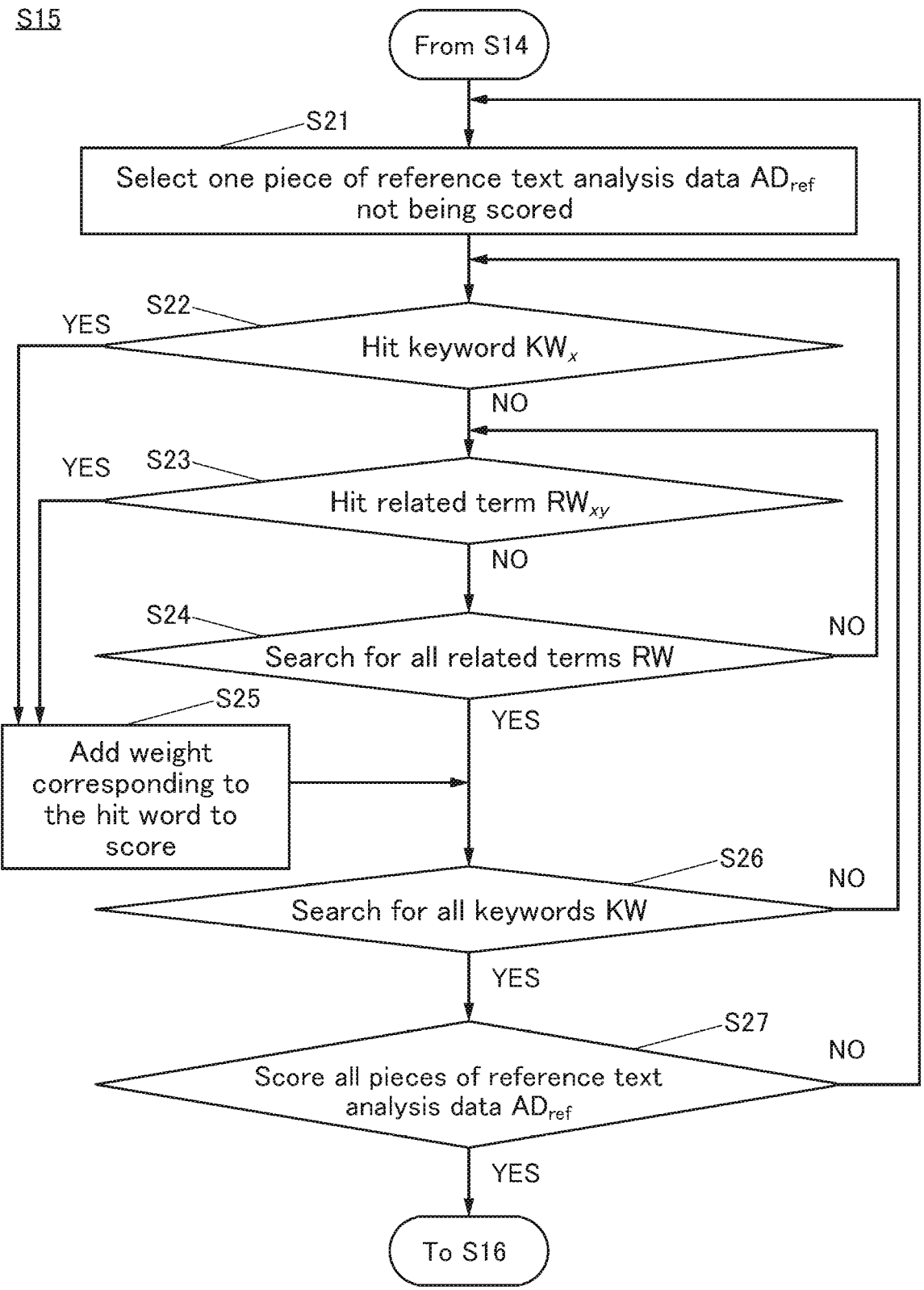
FIG. 8 A flow chart illustrating an example of a document search method.

With reference to FIG. 8, Step S15 is described in detail. As shown in FIG. 8, Step S15 includes Step S21 to Step S27. In the case where the number of keywords KW is p and the number of related words RW of each keyword KW is q, x is an integer greater than or equal to 1 and less than or equal top, and y is an integer greater than or equal to 1 and less than or equal to q.

Step S21

First, one piece of the reference text analysis data $AD_{ref}$ that is not scored is selected.

Step S22

Next, whether the keyword $KW_x$ is hit in the reference text analysis data $AD_{ref}$ is determined. In the case where the keyword $KW_x$ is hit, the processing proceeds to Step S25. In the case where the keyword $KW_x$ is not hit, the processing proceeds to Step S23.

Step S23

Next, whether the related term $RW_{xy}$ of the keyword $KW_x$ is hit in the reference text analysis data $AD_{ref}$ is determined. In the case where the related term $RW_{xy}$ is hit, the processing proceeds to Step S25. In the case where the related term $RW_{xy}$ is not hit, the processing proceeds to Step S24.

Step S24

Next, whether a search for all of the related terms RW of the keyword $KW_x$ is done is determined. In the case where the search is done, the processing proceeds to Step S26. In the case where the search is not done, the processing proceeds to Step S23. For example, in the case where there are two related terms RW of the keyword $KW_x$ and where determination of whether a related term $RW_{x1}$ is hit is done in the previous Step S23, the processing returns to Step S23, and whether a related term $RW_{x2}$ is hit is determined.

Step S25

In Step S25, a weight corresponding to the hit word/term is added to the score. In the case where the word is hit in Step S22, IDF of the keyword $KW_x$ is added to the score. In the case where the term is hit in Step S23, a product of the IDF of keyword $KW_x$ by the relevance degree RS of the related term $RW_{xy}$ is added to the score. Note that in the above example of scoring, addition is made on the numerator of the score.

Step S26

Next, whether a search for all of the keywords KW is done is determined. In the case where the search is done, the processing proceeds to Step S27. In the case where the search is not done, the processing proceeds to Step S22. For example, in the case where there are two keywords $KW_x$ and where determination of whether the keyword $KW_1$ is hit is done in the previous Step S22, the processing returns to Step S22, and whether the keyword $KW_2$ is hit is determined.

Step S27

Next, whether all of pieces of the reference text analysis data $AD_{ref}$ are scored is determined. In the case where all scoring is finished, the processing proceeds to Step S16. In the case where all scoring is not finished, the processing proceeds to Step S21.

Step S16

The reference text analysis data $AD_{ref}$ is ranked, and ranking data LD is generated and output (FIGS. 4 and 5, and FIG. 7(A)).

The processing portion 103 enables the ranking data LD to be supplied to the memory portion 105 or the database 107 through the transmission path 102. In addition, the processing portion 103 enables the ranking data LD to be supplied to the output portion 109 through the transmission path 102. Thus, the output portion 109 enables the ranking data LD to be supplied to the outside of the document search system 100.

The ranking data LD can include ranks (Lank), information on reference text data $TD_{ref}$ (name, identification number, etc.) (Doc), scores (Score), and the like. Note that when the reference text data $TD_{ref}$ is stored in the database 107 or the like, the ranking data LD preferably includes a file path to the reference text data $TD_{ref}$. Thus, a user can freely access a target document from the ranking data LD.

As the score of the reference text analysis data $AD_{ref}$ is high, it can be said that the reference text data $TD_{ref}$ corresponding to the reference text analysis data $AD_{ref}$ is related or similar to the text data TD.

In an example illustrated in FIG. 7(A), the ranking data LD reveals that, among n pieces of the reference text data $TD_{ref}$, data the most related or similar to the text data TD is reference text data $TD_{ref}(7)$, data the second most related or similar is reference text data $TD_{ref}(4)$, and data the third most related or similar is reference text data $TD_{ref}(13)$.

As described above, a search can be performed with use of the document search system 100.

Note that the processing may proceeds to Step S15 after the keyword KW, the weight of the keyword KW (IDF), the related term RW, and the weight of the related term RW (IDF×RS), which are output in Step S14, are compiled manually.

Figure 9:
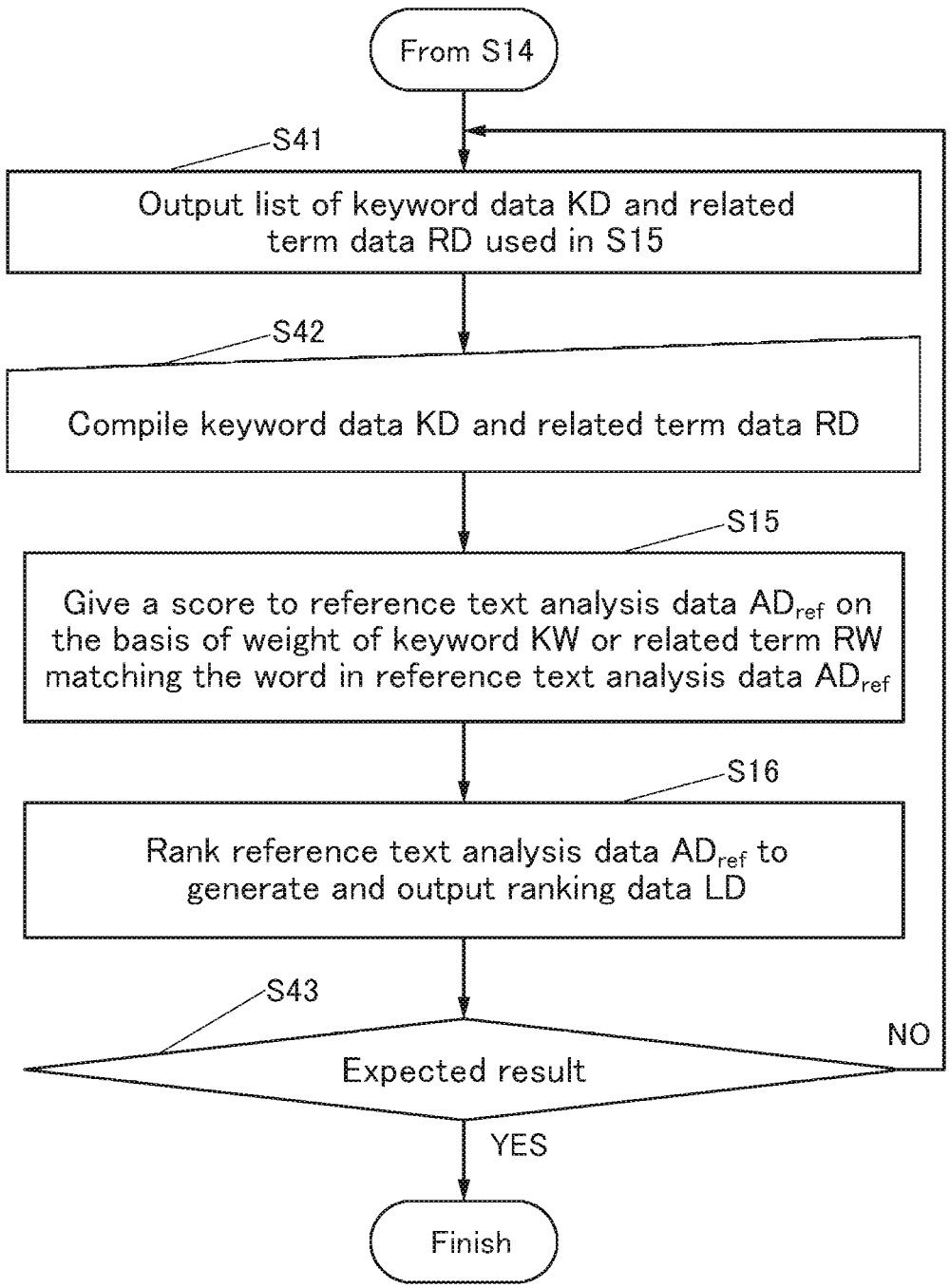
FIG. 9 A flow chart illustrating an example of a document search method.

FIG. 9 shows a flow chart including a step of compilation, and FIG. 10 shows schematic diagrams of the step shown in FIG. 9. Note that the illustration of data shown in FIG. 10 is just an example, and the data is not limited thereto.

Step S41

After Step 14, a table showing keyword data KD and related term data RD that are to be used in Step S15 is output (FIG. 9 and FIG. 10(A)).

FIG. 10(A) shows Word D, Word A, and Word E as the keywords KW, and their respective weights (IDF) of 0.9, 0.9, and 0.8.

Word X, Word Y, Word Z, and Word a are given as the related terms RW of Word D, and respective weights (IDF× RS) are 0.9, 0.8, 0.6, and 0.5.

Word b, Word c, Word d, and Word e are given as the related terms RW of Word A, and respective weights (IDF× RS) are 0.5, 0.5, 0.45, and 0.3.

Word f, Word g, Word h, and Word i are given as the related terms RW of Word E, and respective weights (IDF× RS) are 0.75, 0.75, 0.75, and 0.75.

Step S42

Next, the keyword data KD and the related term data RD are compiled (FIG. 9 and FIG. 10(B)).

FIG. 10B shows an example in which three portions are compiled. Specifically, Word A and the related terms RW thereof are deleted, Word a (weight: 0.5) is changed to Wordx(weight: 0.8), and the weight of Word f is changed (from 0.75 to 0.8).

In the above manner, a user may compile at least one of the word and the weight so as to enhance the search accuracy.

After that, in Step S15, a score is given to the reference text analysis data $AD_{ref}$ with use of the keyword data KD and the related term data RD which have been compiled, and the ranking data LD is generated and output in Step S16.

Step S43

Next, whether the ranking data LD matches an expected result is confirmed (FIG. 9). In the case of the expected result, the search is finished. In the case where the expected result is not obtained, the processing may return to Step S41 so that a table of the keyword data KD and the related term data RD which have been compiled is output, and compilation may be conducted again in Step S42.

Note that as well as manual compilation, automatic compilation may be conducted on the word and the weight with use of dictionary data, analysis data generated by natural language processing, or the like. By the compilation, an enhancement of search accuracy can be achieved.

3. Structure Example of Document Search System 2

Figure 11:
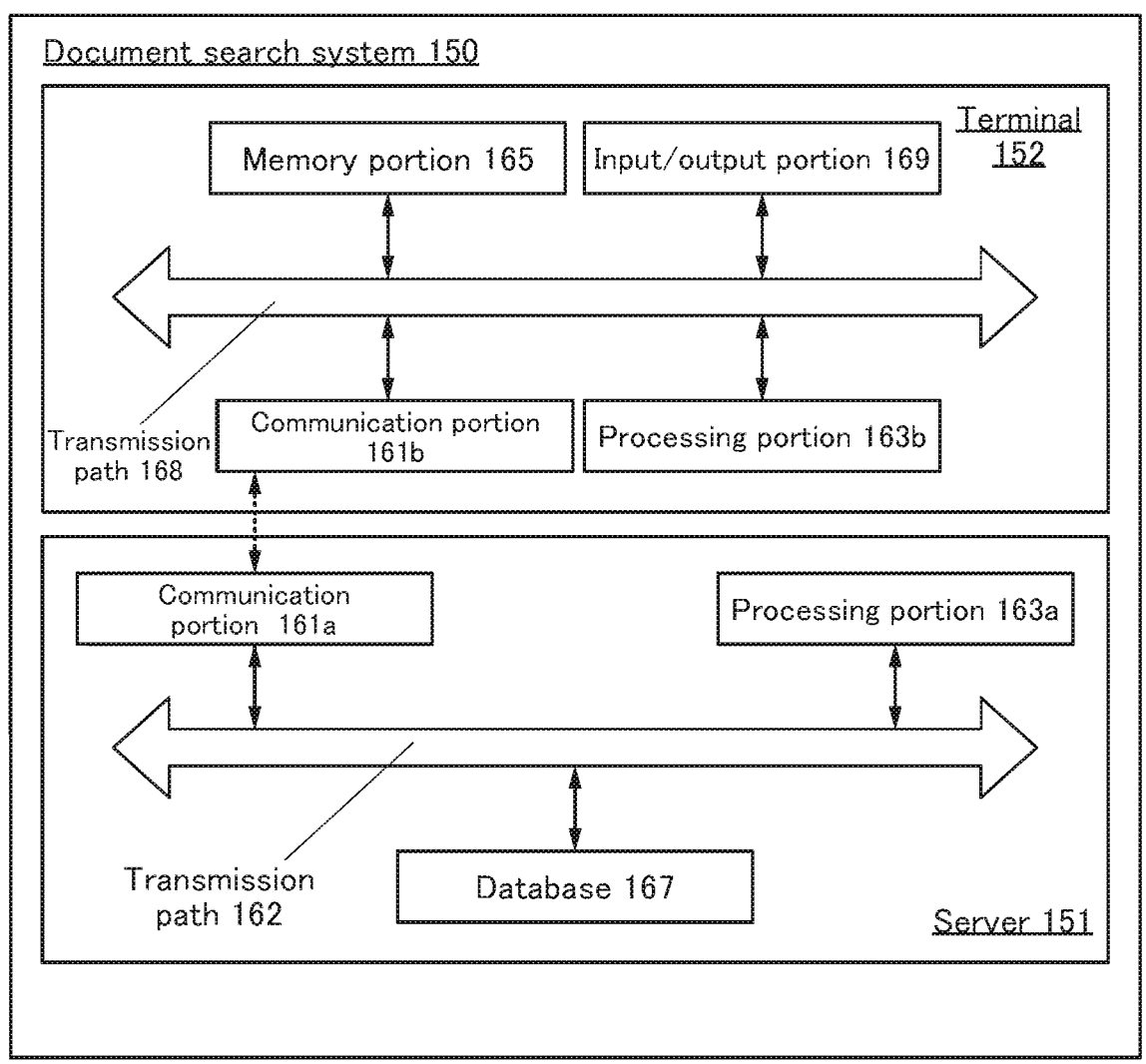
FIG. 11 A block diagram illustrating an example of a document search system.

Next, a document search system 150 illustrated in FIG. 11 is described.

FIG. 11 is a block diagram of the document search system 150. The document search system 150 includes a server 151 and a terminal 152 (such as a personal computer).

The server 151 includes a communication portion 161a, a transmission path 162, a processing portion 163a, and a database 167. The server 151 may further include a memory portion, an input/output portion, or the like although not illustrated in FIG. 11.

The terminal 152 includes a communication portion 161b, a transmission path 168, a processing portion 163b, a memory portion 165, and an input/output portion 169. The terminal 152 may further include a database or the like although not illustrated in FIG. 11.

A user of the document search system 150 inputs the text data TD from the terminal 152 to the server 151. The text data TD is transmitted from the communication portion 161b to the communication portion 161a.

The text data TD received by the communication portion 161a is stored in the database 167 or a memory portion (not illustrated) through the transmission path 162. Alternatively, the text data TD may be directly supplied to the processing portion 163a from the communication portion 161a.

The various processing explained in the above <2. Document search method> is performed in the processing portion 163a. The processing requires high processing capacity, and thus is preferably performed in the processing portion 163a of the server 151.

The processing portion 163a generates ranking data LD. The ranking data LD is stored in the database 167 or the memory portion (not illustrated) through the transmission path 162. Alternatively, the ranking data LD may be directly supplied to the communication portion 161a from the processing portion 163a. After that, the ranking data LD is output from the server 151 to the terminal 152. The ranking data LD is transmitted from the communication portion 161a to the communication portion 161b.

Input/Output Portion 169

Data is supplied from the outside of the document search system 150 to the input/output portion 169. The input/output portion 169 has a function of supplying data to the outside of the document search system 150. Note that an input portion and an output portion may be separated from each other as in the document search system 100.

Transmission Path 162 and Transmission Path 168

The transmission path 162 and the transmission path 168 have a function of transmitting data. The communication portion 161a, the processing portion 163a, and the database 167 can transmit and receive data through the transmission path 162. The communication portion 161b, the processing portion 163b, the memory portion 165, and the input/output portion 169 can transmit and receive data through the transmission path 168.

Processing Portion 163a and Processing Portion 163b

The processing portion 163a has a function of performing a calculation, inference, or the like with use of data supplied from the communication portion 161a, the database 167, or the like. The processing portion 163b has a function of performing a calculation with use of data supplied from the communication portion 161b, the memory portion 165, the input/output portion 169, or the like. The description of the processing portion 103 can be referred to for the processing portion 163a and the processing portion 163b. In particular, the processing portion 163a can perform the various processing explained in the above section <2. Document search method>. Thus, the processing portion 163a preferably has higher processing capacity than the processing portion 163b.

Memory Portion 165

The memory portion 165 has a function of storing a program to be executed by the processing portion 163b. The memory portion 165 has a function of storing calculation results generated by the processing portion 163b, data input to the communication portion 161b, data input to the input/output portion 169, and the like.

Database 167

The database 167 has a function of storing the reference text analysis data $AD_{ref}$, the IDF data ID, and the vector data VD. The database 167 may have a function of storing calculation results generated by the processing portion 163a, data input to the communication portion 161a, and the like. Furthermore, the server 151 may include a memory portion in addition to the database 167, and the memory portion may have a function of storing calculation results generated by the processing portion 163a, data input to the communication portion 161a, and the like.

Communication Portion 161a and Communication Portion 161b

The server 151 and the terminal 152 can transmit and receive data with use of the communication portion 161a and the communication portion 161b. As the communication portion 161a and the communication portion 161b, a hub, a router, a modem, or the like can be used. Data may be transmitted or received through wire communication or wireless communication (e.g., radio waves or infrared rays).

In this manner, the document search system of this embodiment can search documents prepared in advance for documents related or similar to the input documents. It is not necessary for a user to select keywords used for a search, and text data with a larger volume than the keywords can be used for a search; accordingly, differences in search accuracy among individuals can be reduced and documents can be searched easily and accurately. Furthermore, the document search system of this embodiment extracts the related terms of the keywords from the documents prepared in advance, and accordingly can extract unique notation included in the documents as the related term, which enables omission in searches to be inhibited. Moreover, the document search system of this embodiment can output search results that are ranked on the basis of the relevance or similarity degree; accordingly, it becomes easy for a user to find a necessary document from the search results, and oversight less occurs.

This embodiment can be combined with any of the other embodiments as appropriate. In this specification, in the case where a plurality of structure examples are shown in one embodiment, the structure examples can be combined as appropriate.

Embodiment 2

In this embodiment, a structure example of a semiconductor device which can be used for a neural network will be described.

The semiconductor device of one embodiment can be used for a processing portion in a document search system of one embodiment of the present invention.

Figure 12A:
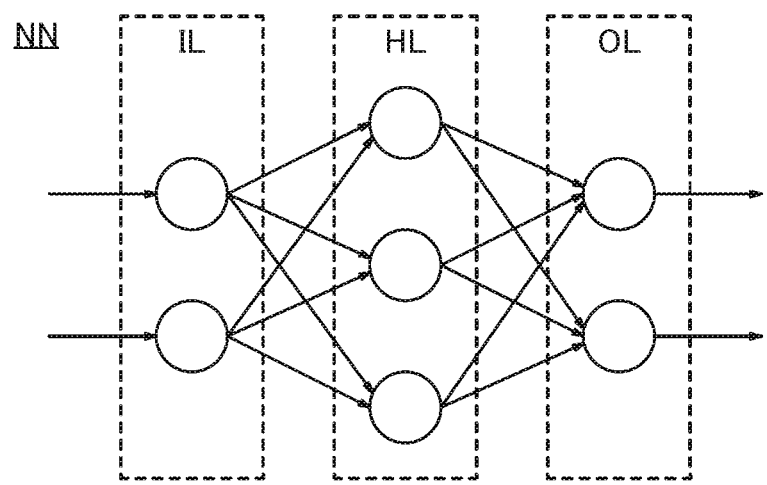
FIG. 12(A) and (B) are diagrams illustrating structure examples of a neural network.

As shown in FIG. 12(A), a neural network NN can be formed of an input layer IL, an output layer OL, and a middle layer (hidden layer) HL. The input layer IL, the output layer OL, and the middle layer HL each include one or more neurons (units). Note that the middle layer HL may be composed of one layer or two or more layers. A neural network including two or more middle layers HL can also be referred to as a DNN (deep neural network), and learning using a deep neural network can also be referred to as deep learning.

Input data is input to neurons of the input layer IL, output signals of neurons in the previous layer or the subsequent layer are input to neurons of the middle layer HL, and output signals of neurons in the previous layer are input to neurons of the output layer OL. Note that each neuron may be connected to all the neurons in the previous and subsequent layers (full connection), or may be connected to some of the neurons.

Figure 12B:
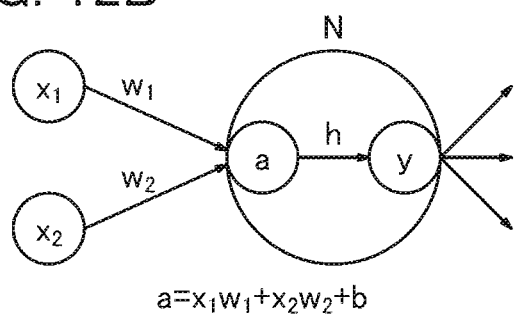

FIG. 12(B) shows an example of a calculation with the neurons. Here, a neuron N and two neurons in the previous layer which output signals to the neuron N are illustrated. An output $x_1$ of a neuron in the previous layer and an output $x_2$ of a neuron in the previous layer are input to the neuron N. Then, in the neuron N, a total sum $x_1w_1+x_2w_2$ of a multiplication result ($x_1w_1$) of the output $x_1$ and a weight $w_1$ and a multiplication result ($x_2w_2$) of the output $x_2$ and a weight $w_2$ is calculated, and then a bias b is added as necessary, so that the value $a=x_1w_1+x_2w_2+b$ is obtained. Then, the value a is converted with an activation function h, and an output signal $y=h(a)$ is output from the neuron N.

In this manner, the calculation with the neurons includes the calculation that sums the products of the outputs and the weights of the neurons in the previous layer, that is, the product-sum operation ($x_1w_1+x_2w_2$ described above). This product-sum operation may be performed using a program on software or using hardware. In the case where the product-sum operation is performed by hardware, a product-sum arithmetic circuit can be used. Either a digital circuit or an analog circuit can be used as this product-sum arithmetic circuit. In the case where an analog circuit is used as the product-sum operation circuit, the circuit scale of the product-sum operation circuit can be reduced, or higher processing speed and lower power consumption can be achieved by reduced frequency of access to a memory.

The product-sum operation circuit may be formed using a transistor including silicon (such as single crystal silicon) in a channel formation region (also referred to as a "Si transistor") or may be formed using a transistor including an oxide semiconductor, which is a kind of metal oxide, in a channel formation region (also referred to as an "OS transistor"). An OS transistor is particularly preferably used as a transistor included in a memory of the product-sum operation circuit because of its extremely low off-state current. Note that the product-sum arithmetic circuit may include both a Si transistor and an OS transistor. A configuration example of a semiconductor device serving as the product-sum arithmetic circuit will be described below.

Structure Example of Semiconductor Device

Figure 13:
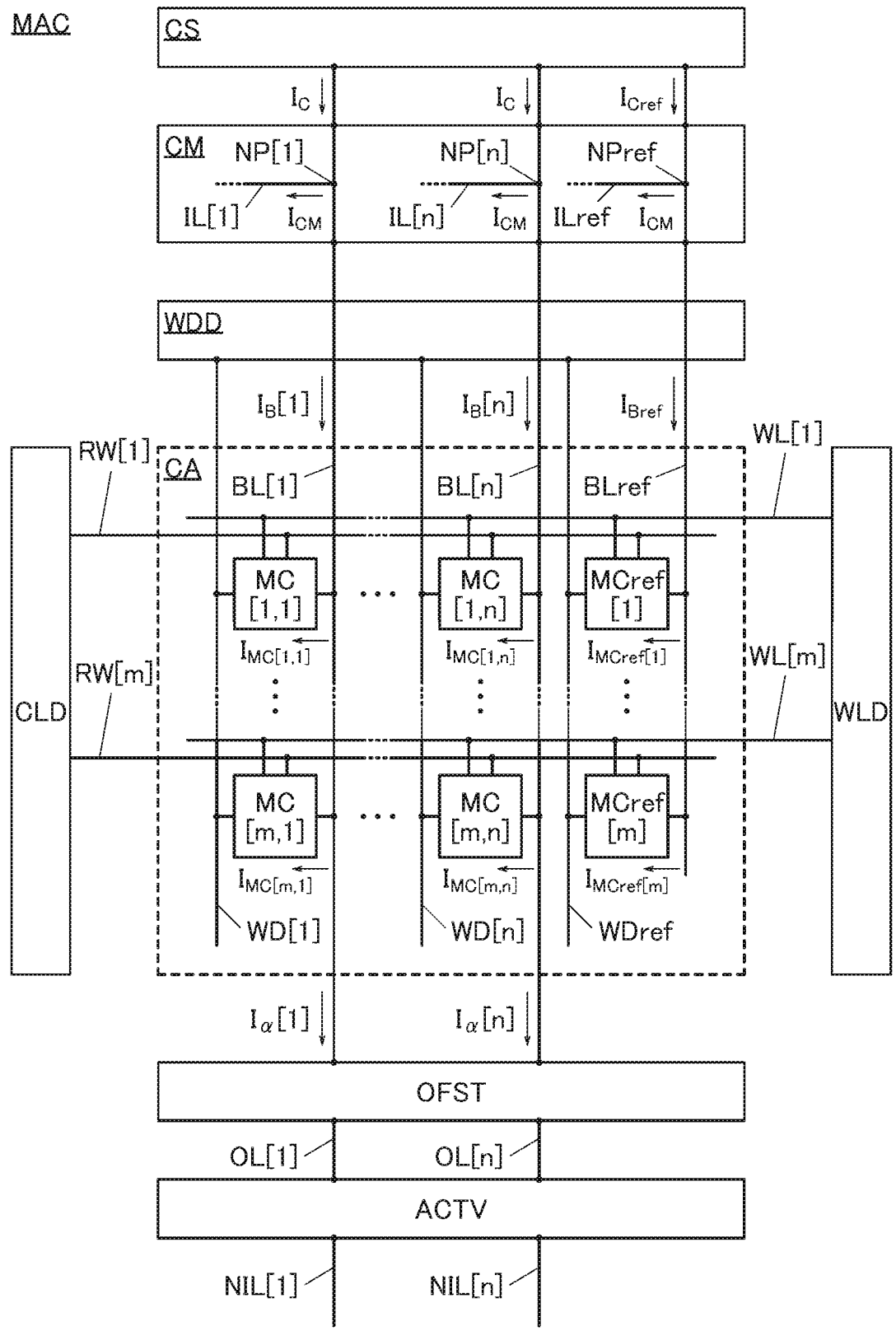
FIG. 13 A diagram illustrating a structure example of a semiconductor device.

FIG. 13 shows a structure example of a semiconductor device MAC having a function of performing a calculation of a neural network. The semiconductor device MAC has a function of performing a product-sum operation of first data corresponding to the connection strength (weight) between the neurons and second data corresponding to input data. Note that the first data and the second data can each be analog data or multilevel digital data (discrete data). The semiconductor device MAC also has a function of converting data obtained by the product-sum operation with the activation function.

The semiconductor device MAC includes a cell array CA, a current source circuit CS, a current mirror circuit CM, a circuit WDD, a circuit WLD, a circuit CLD, an offset circuit OFST, and an activation function circuit ACTV.

The cell array CA includes a plurality of memory cells MC and a plurality of memory cells MCref FIG. 13 illustrates a configuration example in which the cell array CA includes the memory cells MC in m rows and n columns (MC[1, 1] to MC[m, n]) and the m memory cells MCref (MCref[1] to MCref[m]) (m and n are integers greater than or equal to 1). The memory cells MC each have a function of storing the first data. In addition, the memory cells MCref each have a function of storing reference data used for the product-sum operation. Note that the reference data can be analog data or multilevel digital data.

The memory cell MC[i, j] (i is an integer greater than or equal to 1 and less than or equal to m, and j is an integer greater than or equal to 1 and less than or equal to n) is connected to a wiring WL[i], a wiring RW[i], a wiring WD[j], and a wiring BL[j]. In addition, the memory cell MCref[i] is connected to the wiring WL[i], the wiring RW[i], a wiring WDref, and a wiring BLref. Here, a current flowing between the memory cell MC[i, j] and the wiring BL[j] is denoted by $I_{MC[i, j]}$, and a current flowing between the memory cell MCref[i] and the wiring BLref is denoted by $I_{MCref[i]}$.

Figure 14:
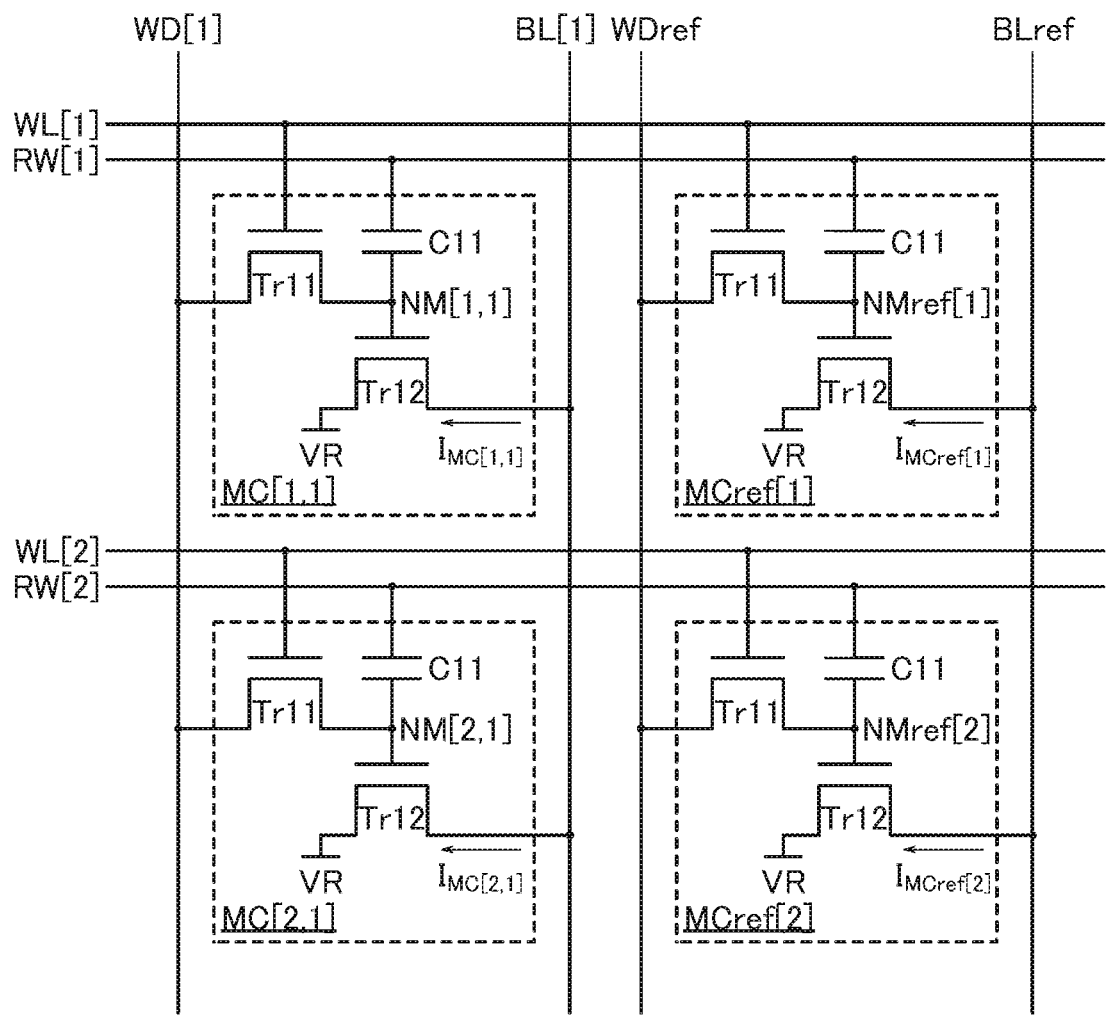
FIG. 14 A diagram illustrating a structure example of a memory cell.

FIG. 14 shows a specific structure example of the memory cells MC and the memory cells MCref Although the memory cells MC[1, 1] and MC[2, 1] and the memory cells MCref[1] and MCref[2] are illustrated in FIG. 14 as typical examples, similar configurations can be used for other memory cells MC and memory cells MCref. The memory cells MC and the memory cells MCref each include a transistor Tr11, a transistor Tr12, and a capacitor C11. Here, the case where the transistor Tr11 and the transistor Tr12 are n-channel transistors will be described.

In the memory cell MC, a gate of the transistor Tr11 is connected to the wiring WL, one of a source and a drain is connected to a gate of the transistor Tr12 and a first electrode of the capacitor C11, and the other of the source and the drain is connected to the wiring WD. One of a source and a drain of the transistor Tr12 is connected to the wiring BL, and the other of the source and the drain of the transistor Tr12 is connected to a wiring VR. A second electrode of the capacitor C11 is connected to the wiring RW. The wiring VR is a wiring having a function of supplying a predetermined potential. In this example, a low power supply potential (e.g., a ground potential) is supplied from the wiring VR.

A node connected to the one of the source and the drain of the transistor Tr11, the gate of the transistor Tr12, and the first electrode of the capacitor C11 is referred to as a node NM. The nodes NM in the memory cells MC[1, 1] and MC[2, 1] are referred to as nodes NM[1, 1] and NM[2, 1], respectively.

The memory cells MCref have a configuration similar to that of the memory cell MC. However, the memory cells MCref are connected to the wiring WDref instead of the wiring WD and connected to a wiring BLref instead of the wiring BL. Nodes in the memory cells MCref[1] and MCref[2] each of which is connected to the one of the source and the drain of the transistor Tr11, the gate of the transistor Tr12, and the first electrode of the capacitor C11 are referred to as nodes NMref[1] and NMref[2], respectively.

The nodes NM and NMref function as holding nodes of the memory cell MC and the memory cell MCref, respectively. The first data is held in the node NM and the reference data is held in the node NMref Currents $I_{MC[1, 1]}$ and $I_{MC[2, 1]}$ from the wiring BL[1] flow to the transistors Tr12 of the memory cells MC[1, 1] and MC[2, 1], respectively. Currents $I_{MCref[1]}$ and $I_{MCref[2]}$ from the wiring BLref flow to the transistors Tr12 of the memory cells MCref[1] and MCref[2], respectively.

Since the transistor Tr11 has a function of holding the potential of the node NM or the node NMref, the off-state current of the transistor Tr11 is preferably low. Thus, it is preferable to use an OS transistor, which has extremely low off-state current, as the transistor Tr11. This suppresses a change in the potential of the node NM or the node NMref, so that the calculation accuracy can be increased. Furthermore, operations of refreshing the potential of the node NM or the node NMref can be performed less frequently, which leads to a reduction in power consumption.

There is no particular limitation on the transistor Tr12, and for example, a Si transistor, an OS transistor, or the like can be used. In the case where an OS transistor is used as the transistor Tr12, the transistor Tr12 can be manufactured with the same manufacturing apparatus as that for the transistor Tr11, and accordingly manufacturing cost can be reduced. Note that the transistor Tr12 may be an n-channel transistor or a p-channel transistor.

The current source circuit CS is connected to the wirings BL[1] to BL[n] and the wiring BLref. The current source circuit CS has a function of supplying currents to the wirings BL[1] to BL[n] and the wiring BLref Note that the value of the current supplied to the wirings BL[1] to BL[n] may be different from the value of the current supplied to the wiring BLref Here, the current supplied from the current source circuit CS to the wirings BL[1] to BL[n] is denoted by $I_C$, and the current supplied from the current source circuit CS to the wiring BLref is denoted by $I_{Cref}$.

The current mirror circuit CM includes wirings IL[1] to IL[n] and a wiring ILref. The wirings IL[1] to IL[n] are connected to the wirings BL[1] to BL[n], respectively, and the wiring ILref is connected to the wiring BLref Here, portions where the wirings IL[1] to IL[n] are connected to the respective wirings BL[1] to BL[n] are referred to as nodes NP[1] to NP[n]. Furthermore, a connection portion between the wiring ILref and the wiring BLref is referred to as a node NPref.

The current mirror circuit CM has a function of making a current $I_{CM}$ corresponding to the potential of the node NPref flow to the wiring ILref and a function of making this current $I_{CM}$ flow also to the wirings IL[1] to IL[n]. In the example illustrated in FIG. 13, the current $I_{CM}$ is discharged from the wiring BLref to the wiring ILref, and the current $I_{CM}$ is discharged from the wirings BL[1] to BL[n] to the wirings IL[1] to IL[n]. Furthermore, currents flowing from the current mirror circuit CM to the cell array CA through the wirings BL[1] to BL[n] are denoted by $I_B[1]$ to $I_B[n]$. Furthermore, a current flowing from the current mirror circuit CM to the cell array CA through the wiring BLref is denoted by $I_{Bref}$.

The circuit WDD is connected to the wirings WD[1] to WD[n] and the wiring WDref. The circuit WDD has a function of supplying a potential corresponding to the first data to be stored in the memory cells MC to the wirings WD[1] to WD[n]. The circuit WDD has also a function of supplying a potential corresponding to the reference data stored in the memory cell MCref to the wiring WDref. The circuit WLD is connected to wirings WL[1] to WL[m]. The circuit WLD has a function of supplying a signal for selecting the memory cell MC or the memory cell MCref to which data is to be written, to any of the wirings WL[1] to WL[m]. The circuit CLD is connected to the wirings RW[1] to RW[m]. The circuit CLD has a function of supplying a potential corresponding to the second data to the wirings RW[1] to RW[m].

The offset circuit OFST is connected to the wirings BL[1] to BL[n] and wirings OL[1] to OL[n]. The offset circuit OFST has a function of detecting the amount of currents flowing from the wirings BL[1] to BL[n] to the offset circuit OFST and/or the amount of change in the currents flowing from the wirings BL[1] to BL[n] to the offset circuit OFST. The offset circuit OFST also has a function of outputting detection results to the wirings OL[1] to OL[n]. Note that the offset circuit OFST may output currents corresponding to the detection results to the wirings OL, or may convert the currents corresponding to the detection results into voltages to output the voltages to the wirings OL. The currents flowing between the cell array CA and the offset circuit OFST are denoted by $I_\alpha[1]$ to $I_\alpha[n]$.

Figure 15:
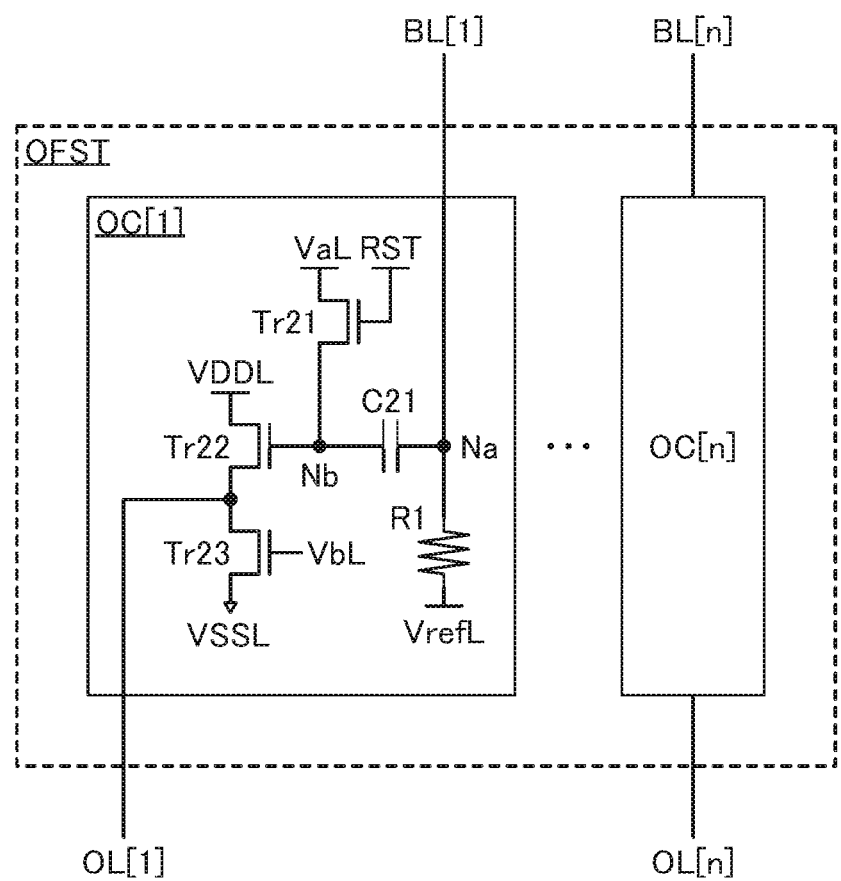
FIG. 15 A diagram illustrating a structure example of an offset circuit.

FIG. 15 shows a structure example of the offset circuit OFST. The offset circuit OFST shown in FIG. 15 includes circuits OC[1] to OC[n]. The circuits OC[1] to OC[n] each include a transistor Tr21, a transistor Tr22, a transistor Tr23, a capacitor C21, and a resistor R1. Connection relationships of the elements are shown in FIG. 15. Note that a node connected to a first electrode of the capacitor C21 and a first terminal of the resistor R1 is referred to as a node Na. In addition, a node connected to a second electrode of the capacitor C21, one of a source and a drain of the transistor Tr21, and a gate of the transistor Tr22 is referred to as a node Nb.

A wiring VrefL has a function of supplying a potential Vref, a wiring VaL has a function of supplying a potential Va, and a wiring VbL has a function of supplying a potential Vb. Furthermore, a wiring VDDL has a function of supplying a potential VDD, and a wiring VSSL has a function of supplying a potential VSS. Here, the case where the potential VDD is a high power supply potential and the potential VSS is a low power supply potential is described. A wiring RST has a function of supplying a potential for controlling the conduction state of the transistor Tr21. The transistor Tr22, the transistor Tr23, the wiring VDDL, the wiring VSSL, and the wiring VbL form a source follower circuit.

Next, an operation example of the circuits OC[1] to OC[n] will be described. Note that although an operation example of the circuit OC[1] is described here as a typical example, the circuits OC[2] to OC[n] can operate in a similar manner. First, when a first current flows to the wiring BL[1], the potential of the node Na becomes a potential corresponding to the first current and the resistance value of the resistor R1. At this time, the transistor Tr21 is on, and thus the potential Va is supplied to the node Nb. Then, the transistor Tr21 is turned off.

Next, when a second current flows to the wiring BL[1], the potential of the node Na becomes a potential corresponding to the second current and the resistance value of the resistor R1. At this time, since the transistor Tr21 is off and the node Nb is in a floating state, the potential of the node Nb is changed owing to capacitive coupling, following the change in the potential of the node Na. Here, when the amount of change in the potential of the node Na is $\Delta V_{Na}$ and the capacitive coupling coefficient is 1, the potential of the node Nb is Va+$\Delta V_{Na}$. In addition, when the threshold voltage of the transistor Tr22 is $V_{th}$, a potential of Va+$\Delta V_{Na}$–$V_{th}$ is output from the wiring OL[1]. Here, when Va=$V_{th}$, the potential $\Delta V_{Na}$ can be output from the wiring OL[1].

The potential $\Delta V_{Na}$ is determined by the amount of change from the first current to the second current, the resistance of the resistor R1, and the potential Vref Here, since the resistance of the resistor R1 and the potential Vref are known, the amount of change in the current flowing to the wiring BL can be found from the potential $\Delta V_{Na}$.

A signal corresponding to the amount of current and/or the amount of change in the current that are/is detected by the offset circuit OFST as described above is input to the activation function circuit ACTV through the wirings OL[1] to OL[n].

The activation function circuit ACTV is connected to the wirings OL[1] to OL[n] and wirings NIL[1] to NIL[n]. The activation function circuit ACTV has a function of performing a calculation for converting the signal input from the offset circuit OFST in accordance with the predefined activation function. As the activation function, for example, a sigmoid function, a tanh function, a softmax function, a ReLU function, a threshold function, or the like can be used. The signal converted by the activation function circuit ACTV is output as output data to the wirings NIL[1] to NIL[n].

Operation Example of Semiconductor Device

With the above semiconductor device MAC, the product-sum operation of the first data and the second data can be performed. An operation example of the semiconductor device MAC at the time of performing the product-sum operation will be described below.

Figure 16:
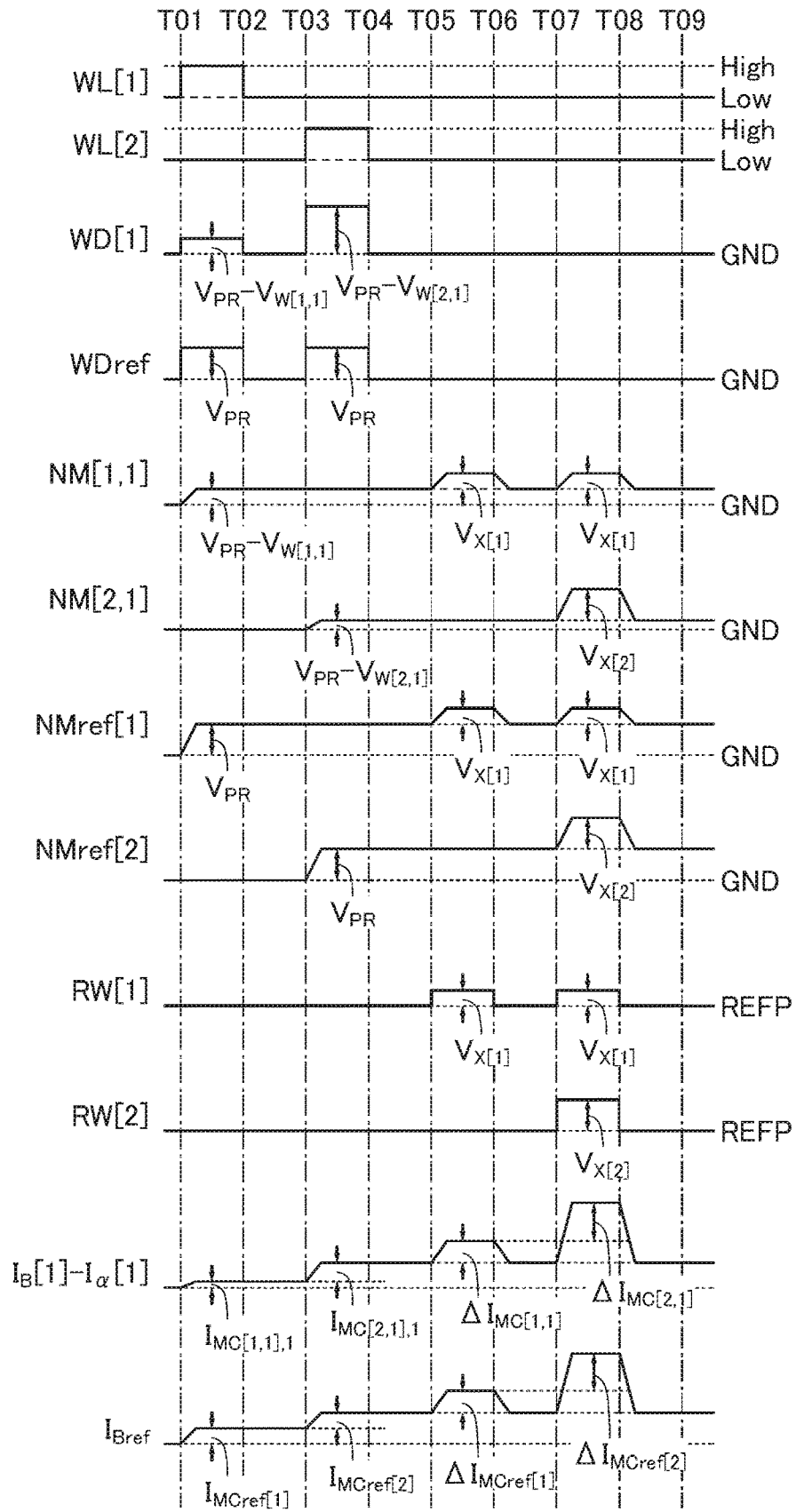
FIG. 16 A timing chart.

FIG. 16 shows a timing chart of the operation example of the semiconductor device MAC. FIG. 16 shows changes in the potentials of the wiring WL[1], the wiring WL[2], the wiring WD[1], the wiring WDref, the node NM[1, 1], the node NM[2, 1], the node NMref[1], the node NMref[2], the wiring RW[1], and the wiring RW[2] in FIG. 14 and changes in the values of the current $I_B[1]$–$I_\alpha[1]$ and the current $I_{Bref}$. The current $I_B[1]$–$I_\alpha[1]$ corresponds to the sum total of the currents flowing from the wiring BL[1] to the memory cells MC[1, 1] and MC[2, 1].

Although an operation is described with a focus on the memory cells MC[1, 1] and MC[2, 1] and the memory cells MCref[1] and MCref[2] illustrated in FIG. 14 as a typical example, the other memory cells MC and the other memory cells MCref can be operated in a similar manner.

Storage of First Data

First, in a period from Time T01 to Time T02, the potential of the wiring WL[1] becomes a high level (High), the potential of the wiring WD[1] becomes a potential greater than a ground potential (GND) by $V_{PR}$–$V_{W[1, 1]}$, and the potential of the wiring WDref becomes a potential greater than the ground potential by $V_{PR}$. The potentials of the wiring RW[1] and the wiring RW[2] become reference potentials (REFP). Note that the potential $V_{W[1, 1]}$ is the potential corresponding to the first data stored in the memory cell MC[1, 1]. The potential $V_{PR}$ is the potential corresponding to the reference data. Thus, the transistors Tr11 included in the memory cell MC[1, 1] and the memory cell MCref[1] are brought into on states, and the potential of the node NM[1, 1] becomes $V_{PR}$–$V_{W[1, 1]}$ and the potential of the node NMref[1] becomes $V_{PR}$.

In this case, a current $I_{MC[1, 1], 0}$ flowing from the wiring BL[1] to the transistor Tr12 in the memory cell MC[1, 1] can be expressed by a formula shown below. Here, k is a constant determined by the channel length, the channel width, the mobility, the capacitance of a gate insulating film, and the like of the transistor Tr12. In addition, $V_{th}$ is the threshold voltage of the transistor Tr12.

$$I_{MC[1, 1], 0} = k(V_{PR} - V_{W[1, 1]} - V_{th})^2 \tag{E1}$$

A current $I_{MCref[1], 0}$ flowing from the wiring BLref to the transistor Tr12 in the memory cell MCref[1] can be expressed by a formula shown below.

$$I_{MCref[1], 0} = k(V_{PR} - V_{th})^2 \tag{E2}$$

Next, in a period from Time T02 to Time T03, the potential of the wiring WL[1] becomes a low level (Low). Consequently, the transistors Tr11 included in the memory cell MC[1, 1] and the memory cell MCref[1] are brought into off states, and the potentials of the node NM[1, 1] and the node NMref[1] are retained.

As described above, an OS transistor is preferably used as the transistor Tr11. This can suppress the leakage current of the transistor Tr11, so that the potentials of the node NM[1, 1] and the node NMref[1] can be retained accurately.

Next, in a period from Time T03 to Time T04, the potential of the wiring WL[2] becomes the high level, the potential of the wiring WD[1] becomes a potential greater than the ground potential by $V_{PR}$–$V_{W[2, 1]}$, and the potential of the wiring WDref becomes a potential greater than the ground potential by $V_{PR}$. Note that the potential $V_{W[2, 1]}$ is a potential corresponding to the first data stored in the memory cell MC[2, 1]. Thus, the transistors Tr11 included in the memory cell MC[2, 1] and the memory cell MCref[2] are brought into on states, and the potential of the node NM[2, 1] becomes $V_{PR}$–$V_{W[2, 1]}$ and the potential of the node NMref[2] becomes $V_{PR}$.

Here, a current $I_{MC[2, 1], 0}$ flowing from the wiring BL[1] to the transistor Tr12 in the memory cell MC[2, 1] can be expressed by a formula shown below.

$$I_{MC[2,1],0} = k(V_{PR} - V_{W[2,1]} - V_{th})^2 \tag{E3}$$

Furthermore, a current $I_{MCref[2], 0}$ flowing from the wiring BLref to the transistor Tr12 in the memory cell MCref[2] can be expressed by a formula shown below.

$$I_{MCref[2],0} = k(V_{PR} - V_{th})^2 \tag{E4}$$

Next, in a period from Time T04 to Time T05, the potential of the wiring WL[2] becomes the low level. Consequently, the transistors Tr11 included in the memory cell MC[2, 1] and the memory cell MCref[2] are brought into off states, and the potentials of the node NM[2, 1] and the node NMref[2] are retained.

Through the above operation, the first data is stored in the memory cells MC[1, 1] and MC[2, 1], and the reference data is stored in the memory cells MCref[1] and MCref[2].

Here, currents flowing through the wiring BL[1] and the wiring BLref in the period from Time T04 to Time T05 are considered. The current is supplied from the current source circuit CS to the wiring BLref. The current flowing through the wiring BLref is discharged to the current mirror circuit CM and the memory cells MCref[1] and MCref[2]. A formula shown below holds, where $I_{Cref}$ is the current supplied from the current source circuit CS to the wiring BLref and $I_{CM,\,0}$ is the current discharged from the wiring BLref to the current mirror circuit CM.

$$I_{Cref} - I_{CM,0} = I_{MCref[1],0} + I_{MCref[2],0} \quad (E5)$$

The current from the current source circuit CS is supplied to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds, where $I_{C,\,0}$ is the current supplied from the current source circuit CS to the wiring BL[1] and $I_{\alpha,\,0}$ is the current flowing from the wiring BL[1] to the offset circuit OFST.

$$I_C - I_{CM,0} = I_{MC[1,1],0} + I_{MC[2,1],0} + I_{\alpha,0} \quad (E6)$$

Product-Sum Operation of First Data and Second Data

Next, in a period from Time T05 to Time T06, the potential of the wiring RW[1] becomes a potential greater than the reference potential by $V_{X[1]}$. At this time, the potential $V_{X[1]}$ is supplied to the capacitor C11 in each of the memory cell MC[1, 1] and the memory cell MCref[1], so that the potential of the gate of the transistor Tr12 is increased because of capacitive coupling. Note that the potential $V_{X[1]}$ is a potential corresponding to the second data supplied to the memory cell MC[1, 1] and the memory cell MCref[1].

The amount of change in the potential of the gate of the transistor Tr12 corresponds to the value obtained by multiplying the amount of change in the potential of the wiring RW by a capacitive coupling coefficient determined by the memory cell configuration. The capacitive coupling coefficient is calculated using the capacitance of the capacitor C11, the gate capacitance of the transistor Tr12, the parasitic capacitance, and the like. In the following description, for convenience, the amount of change in the potential of the wiring RW is equal to the amount of change in the potential of the gate of the transistor Tr12, that is, the capacitive coupling coefficient is set to 1. In practice, the potential $V_X$ can be determined in consideration of the capacitive coupling coefficient.

When the potential $V_X[1]$ is supplied to the capacitors C11 in the memory cell MC[1, 1] and the memory cell MCref[1], the potentials of the node NM[1, 1] and the node NMref[1] each increase by $V_X[1]$.

Here, a current $I_{MC[1,\,1],\,1}$ flowing from the wiring BL[1] to the transistor Tr12 in the memory cell MC[1, 1] in the period from Time T05 to Time T06 can be expressed by the following formula.

$$I_{Mc[1,1],1} = k(V_{PR} - V_{w[1,1]} + V_{X[1]} - V_{th})^2 \quad (E7)$$

Thus, when the potential $V_{X[1]}$ is supplied to the wiring RW[1], the current flowing from the wiring BL[1] to the transistor Tr12 in the memory cell MC[1, 1] increases by $\Delta I_{MC[1,\,1]} = I_{MC[1,\,1],\,1} - I_{MC[1,\,1],\,0}$.

A current $I_{MCref[1,\,1]}$ flowing from the wiring BLref to the transistor Tr12 in the memory cell MCref[1] in the period from Time T05 to Time T06 can be expressed by the following formula.

$$I_{MCref[1],1} = k(V_{PR} + V_{X[1]} - V_{th})^2 \quad (E8)$$

Thus, when the potential $V_X[1]$ is supplied to the wiring RW[1], the current flowing from the wiring BLref to the transistor Tr12 in the memory cell MCref[1] increases by $\Delta I_{MCref[1]} = I_{MCref[1],\,1} - I_{MCref[1],\,0}$.

Furthermore, currents flowing through the wiring BL[1] and the wiring BLref are considered. The current $I_{Cref}$ is supplied from the current source circuit CS to the wiring BLref. The current flowing through the wiring BLref is discharged to the current mirror circuit CM and the memory cells MCref[1] and MCref[2]. A formula shown below holds, where $I_{CM,\,1}$ is the current discharged from the wiring BLref to the current mirror circuit CM.

$$I_{Cref} - I_{CM,1} = I_{MCref[1],1} + I_{MCref[2],0} \quad (E9)$$

The current $I_C$ from the current source circuit CS is supplied to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds, where $I_{\alpha,\,1}$ is the current flowing from the wiring BL[1] to the offset circuit OFST.

$$I_C - I_{CM,1} = I_{MC[1,1],1} + I_{MC[2,1],1} + I_{\alpha,1} \quad (E10)$$

In addition, from Formula (E1) to Formula (E10), a difference between the current $I_{\alpha,\,0}$ and the current $I_{\alpha,\,1}$ (differential current $\Delta I_\alpha$) can be expressed by a formula shown below.

$$\Delta I_\alpha = I_{\alpha,1} - I_{\alpha,0} = 2kV_{W[1,1]}V_{X[1]} \quad (E11)$$

Thus, the differential current $\Delta I_\alpha$ is a value corresponding to the product of the potentials $V_{W[1,\,1]}$ and $V_X[1]$.

After that, in a period from Time T06 to Time T07, the potential of the wiring RW [1] becomes the reference potential, and the potentials of the node NM[1, 1] and the node NMref[1] become similar to those in the period from Time T04 to Time T05.

Next, in a period from Time T07 to Time T08, the potential of the wiring RW[1] becomes a potential greater than the reference potential by $V_{X[1]}$, and the potential of the wiring RW[2] becomes a potential greater than the reference potential by $V_X[2]$. Accordingly, the potential $V_{X[}1]$ is supplied to the capacitor C11 in each of the memory cell MC[1, 1] and the memory cell MCref[1], and the potentials of the node NM[1, 1] and the node NMref[1] each increase by $V_X[1]$ because of capacitive coupling. Furthermore, the potential $V_X[2]$ is supplied to the capacitor C11 in each of the memory cell MC[2, 1] and the memory cell MCref[2], and the potentials of the node NM[2, 1] and the node NMref[2] each increase by $V_X[2]$ because of capacitive coupling.

Here, a current $I_{MC[2, 1], 1}$ flowing from the wiring BL[1] to the transistor Tr12 in the memory cell MC[2, 1] in the period from Time T07 to Time T08 can be expressed by the following formula.

$$I_{MC[2,1],1} = k(V_{PR} - V_{W[2,1]} + V_{X[2]} - V_{th})^2 \quad (E12)$$

Thus, when the potential $V_X[2]$ is supplied to the wiring RW[2], the current flowing from the wiring BL[1] to the transistor Tr12 in the memory cell MC[2, 1] increases by $\Delta I_{MC[2, 1]} = I_{MC[2, 1], 1} - I_{MC[2, 1], 0}$.

A current $I_{MCref[2], 1}$ flowing from the wiring BLref to the transistor Tr12 in the memory cell MCref[2] in the period from Time T07 to Time T08 can be expressed by the following formula.

$$I_{MCref[2],1} = k(V_{PR} + V_{X[2]} - V_{th})^2 \quad (E13)$$

Thus, when the potential $V_{X[2]}$ is supplied to the wiring RW[2], the current flowing from the wiring BLref to the transistor Tr12 in the memory cell MCref[2] increases by $\Delta I_{MCref[0]} = I_{MCref[2], 1} - I_{MCref[2], 0}$.

Furthermore, currents flowing through the wiring BL[1] and the wiring BLref are considered. The current $I_{Cref}$ is supplied from the current source circuit CS to the wiring BLref. The current flowing through the wiring BLref is discharged to the current mirror circuit CM and the memory cells MCref[1] and MCref[2]. A formula shown below holds, where $I_{CM, 2}$ is the current discharged from the wiring BLref to the current mirror circuit CM.

$$I_{Cref} - I_{CM,2} = I_{MCref[1],1} + I_{MCref[2],1} \quad (E14)$$

The current $I_C$ from the current source circuit CS is supplied to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds, where $I_{\alpha, 2}$ is the current flowing from the wiring BL[1] to the offset circuit OFST.

$$I_C - I_{CM,2} = I_{MC[1,1],1} + I_{MC[2,1],1} + I_{\alpha,2} \quad (E15)$$

In addition, from the formula (E1) to the formula (E8) and the formula (E12) to the formula (E15), a difference between the current $I_{\alpha, 0}$ and the current $I_{\alpha, 2}$ (differential current $\Delta I_\alpha$) can be expressed by the following formula.

$$\Delta I_\alpha = I_{\alpha,2} - I_{\alpha,0} = 2k(V_{W[1,1]}V_{X[1]} + V_{W[2,1]}V_{X[2]}) \quad (E16)$$

Thus, the differential current $\Delta I_\alpha$ is a value corresponding to the sum of the product of the potentials $V_{W[1, 1]}$ and $V_{X[1]}$ and the product of the potentials $V_{W[2, 1]}$ and $V_{X[2]}$.

After that, in a period from Time T08 to Time T09, the potentials of the wirings RW[1] and RW[2] become the reference potential, and the potentials of the nodes NM[1, 1] and NM[2, 1] and the nodes NMref[1] and NMref[2] become similar to those in the period from Time T04 to Time T05.

As represented by the formula (E11) and the formula (E16), the differential current $\Delta I_\alpha$ input to the offset circuit OFST can be calculated from the formula including a product term of the potentials $V_W$ corresponding to the first data (weight) and the potential $V_X$ corresponding to the second data (input data). Thus, measurement of the differential current $\Delta I_\alpha$ with the offset circuit OFST gives the result of the product-sum operation of the first data and the second data.

Note that although the memory cells MC[1, 1] and MC[2, 1] and the memory cells MCref[1] and MCref[2] are particularly focused on in the above description, the number of the memory cells MC and the memory cells MCref can be freely set. In the case where the number m of rows of the memory cells MC and the memory cells MCref is an arbitrary number i, the differential current $\Delta I_\alpha$ can be expressed by the following formula.

$$\Delta I_\alpha = 2k \sum_i V_{W[i,1]} V_{X[i]} \quad (E17)$$

When the number n of columns of the memory cells MC and the memory cells MCref is increased, the number of product-sum operations executed in parallel can be increased.

The product-sum operation of the first data and the second data can be performed using the semiconductor device MAC as described above. Note that the use of the structure of the memory cells MC and the memory cells MCref in FIG. 14 allows the product-sum operation circuit to be formed of fewer transistors. Accordingly, the circuit scale of the semiconductor device MAC can be reduced.

In the case where the semiconductor device MAC is used for the operation in the neural network, the number m of rows of the memory cells MC can correspond to the number of pieces of input data supplied to one neuron and the number n of columns of the memory cells MC can correspond to the number of neurons. For example, the case where a product-sum operation using the semiconductor device MAC is performed in the middle layer HL in FIG. 12(A) is considered. In this case, the number m of rows of the memory cells MC can be set to the number of pieces of input data supplied from the input layer IL (the number of neurons in the input layer IL), and the number n of columns of the memory cells MC can be set to the number of neurons in the middle layer HL.

Note that there is no particular limitation on the configuration of the neural network for which the semiconductor device MAC is used. For example, the semiconductor device MAC can also be used for a convolutional neural network (CNN), a recurrent neural network (RNN), an autoencoder, a Boltzmann machine (including a restricted Boltzmann machine), and the like.

The product-sum operation of the neural network can be performed using the semiconductor device MAC as described above. Furthermore, the memory cells MC and the memory cells MCref shown in FIG. 14 are used for the cell array CA, which can provide an integrated circuit with improved calculation accuracy, lower power consumption, or a reduced circuit scale.

This embodiment can be combined with any of the other embodiments as appropriate.

REFERENCE NUMERALS

AD: text analysis data, $AD_{ref}$: reference text analysis data, C11: capacitor, C21: capacitor, ID: IDF data, KD: keyword data, KW: keyword, $KW_1$: keyword, $KW_2$: keyword, $KW_x$: keyword, LD: ranking data, NN: neural network, R1: resistor, RD: related term data, RS: relevance degree, RW: related term, $RW_{x1}$: related term, $RW_{x2}$: related term, $RW_{xy}$: related term, TD: text data, $TD_{ref}$: reference text data, Tr11: transistor, Tr12: transistor, Tr21: transistor, Tr22: transistor, Tr23: transistor, VD: vector data, 100: document search system, 101: input portion, 102: transmission path, 103: processing portion, 105: memory portion, 107: database, 109: output portion, 150: document search system, 151: server, 152: terminal, 161a: communication portion, 161b: communication portion, 162: transmission path, 163a: processing portion, 163b: processing portion, 165: memory portion, 167: database, 168: transmission path, 169: input/output portion

The invention claimed is:

1. A document search device, for searching a document related or similar to an input document, comprising a processing portion that is configured to:
   obtain a first distributed representation vector and a first weight of the first distributed representation vector from the input document;
   extract related terms of a keyword extracted from words included in the input document based on a similarity degree with between the first distributed representation vector and a second distributed representation vector of words included in a plurality of pieces of reference text analysis data;
   obtain a second weight of the related terms, the second weight comprising a product of the first weight by the similarity degree;
   output the first weight and the second weight;
   receive a change to value of one or more of the first weight and the second weight; and
   execute the search of the document by using the first weight and the second weight that were compiled.

2. The document search device according to claim 1, wherein the first distributed representation vector and the second distributed representation vector are obtained through a machine learning of distributed representation of a word included in the plurality of pieces of reference text analysis data.

3. The document search device according to claim 2, wherein the plurality of pieces of the reference text analysis data is generated by performing a morphological analysis on reference text data.

4. The document search device according to claim 1, wherein the first distributed representation vector is obtained from a keyword extracted from the input document.

5. The document search device according to claim 2, wherein the machine learning uses a neural network.

6. A document search device comprising:
   a memory portion having instructions stored thereon that, when executed by a processing portion, cause the processing portion to perform operations for searching a document in view of an input document, the operations comprising:
      obtaining a first distributed representation vector and a first weight of the first distributed representation vector from the input document,
      extracting related terms of a keyword extracted from words included in the input document based on a similarity degree with between the first distributed representation vector and a second distributed representation vector of the words included in a plurality of pieces of reference text analysis data,
      obtaining a second weight of the related terms, the second weight comprising a product of the first weight and the similarity degree,
      outputting the first weight and the second weight, and
      executing a search of the document using a changed value of one or more of the first weight and the second weight, the changed value being provided through compiling of keyword data and related term data.

7. The document search device according to claim 6, wherein the first distributed representation vector and the second distributed representation vector are obtained through a machine learning of distributed representation of a word included in the plurality of pieces of reference text analysis data.

8. The document search device according to claim 7, wherein the plurality of pieces of the reference text analysis data is generated by performing a morphological analysis on reference text data.

9. The document search device according to claim 7, wherein the machine learning uses a neural network.

10. The document search device according to claim 6, wherein the first distributed representation vector is obtained from a keyword extracted from the input document.

* * * * *